(12) United States Patent
Vicharelli et al.

(10) Patent No.: US 7,672,672 B2
(45) Date of Patent: *Mar. 2, 2010

(54) METHODS AND TECHNIQUES FOR PENALTY-BASED CHANNEL ASSIGNMENTS IN A CELLULAR NETWORK

(75) Inventors: Pablo A. Vicharelli, Carlisle, MA (US); Pete A. Boyer, Somerville, MA (US)

(73) Assignee: Verizon Laboratories Inc., Waltham, MA (US)

( * ) Notice: Subject to any disclaimer, the term of this patent is extended or adjusted under 35 U.S.C. 154(b) by 1274 days.

This patent is subject to a terminal disclaimer.

(21) Appl. No.: 11/148,897

(22) Filed: Jun. 9, 2005

(65) Prior Publication Data

US 2006/0009226 A1    Jan. 12, 2006

Related U.S. Application Data

(63) Continuation of application No. 09/957,917, filed on Sep. 21, 2001, now Pat. No. 7,212,822.

(51) Int. Cl.
*H04Q 7/20* (2006.01)
*H04W 4/00* (2006.01)

(52) U.S. Cl. ............... 455/450; 455/446; 455/447

(58) Field of Classification Search ........... 455/450, 455/452.1, 452.2, 447, 446, 509, 62, 422.1, 455/464, 451, 507, 453, 455; 370/329, 437
See application file for complete search history.

(56) References Cited

U.S. PATENT DOCUMENTS

| | | | |
|---|---|---|---|
| 4,670,899 A | 6/1987 | Brody et al. ............ 379/60 |
| 5,038,399 A | 8/1991 | Bruckert ............... 455/33 |
| 5,134,709 A | 7/1992 | Bi et al. .............. 455/33.1 |
| 5,148,548 A | 9/1992 | Meche et al. .......... 455/34.1 |
| 5,355,367 A | 10/1994 | Comroe et al. ......... 370/95.1 |
| 5,430,761 A | 7/1995 | Bruckert et al. ........ 375/200 |
| 5,437,054 A | 7/1995 | Rappaport et al. ..... 455/33.1 |
| 5,448,621 A | 9/1995 | Knudsen ............... 379/58 |
| 5,483,666 A | 1/1996 | Yamada et al. ........ 455/33.1 |
| 5,513,379 A | 4/1996 | Benveniste et al. ..... 455/33.1 |
| 5,574,466 A | 11/1996 | Reed et al. ............ 342/359 |
| 5,603,085 A | 2/1997 | Shedlo ................ 455/33.1 |
| 5,666,655 A | 9/1997 | Ishikawa et al. ....... 455/512 |
| 5,710,758 A | 1/1998 | Soliman et al. ......... 370/241 |
| 5,726,978 A | 3/1998 | Frodigh et al. ......... 370/252 |
| 5,859,841 A | 1/1999 | Gitlits ................. 370/335 |
| 5,886,988 A * | 3/1999 | Yun et al. .............. 370/329 |
| 5,926,763 A | 7/1999 | Greene, Sr. et al. ..... 455/450 |
| 5,963,867 A | 10/1999 | Reynolds et al. ....... 455/457 |

(Continued)

OTHER PUBLICATIONS

L.G. Anderson, A Simulation Study of Some Dynamic Channel Assignment Algorithms in a High Capacity Mobile Telecommunications System, IEEE Transactions on Vehicular Technology, vol. VT-22, No. 4, Nov. 1973, pp. 210-217.

(Continued)

*Primary Examiner*—Melur Ramakrishnaiah

(57) ABSTRACT

A cellular network configuration tool is described that performs frequency assignments for use in a cellular network. The channels are assigned in accordance with input configuration data such as a channel separation matrix, geographic data, and requested channel assignments for each sector included in the cellular network being configured. The configuration is performed in accordance with predetermined constraints and criteria and quality of service input. The tool uses frequency assignment techniques to perform the channel assignments in accordance with varying constraints and criteria. A penalty function is used to determine a figure of merit for a particular set of frequency assignments.

11 Claims, 30 Drawing Sheets

U.S. PATENT DOCUMENTS

| | | | | |
|---|---|---|---|---|
| 6,075,777 | A | * | 6/2000 | Agrawal et al. ............. 370/329 |
| 6,119,011 | A | * | 9/2000 | Borst et al. ................. 455/452 |
| 6,154,655 | A | * | 11/2000 | Borst et al. ................. 455/451 |
| 6,728,544 | B1 | * | 4/2004 | Boyer et al. ................ 455/450 |

OTHER PUBLICATIONS

H. Sekiguchi, H. Ishikawa, M. Koyama, H. Sawada: Techniques for Increasing Frequency Spectrum Utilization in Mobile Radio Communication System: Musashino Electrical Communications, Tokyo, Japan, CH2037-0/85/0000-0026, 1985 IEEE (pp. 26-31).

F. Box, A Heuristic Technique for Assigning Frequencies to Mobile Radio Nets, IEEE Transactions on Vehicular Technology, vol. VT-27, No. 2, May 1978, pp. 57-64.

M. Duque-Anton, D. Kunz, B. Ruber, Channel Assignment for Cellular Radio Using Simulated Annealing, IEEE Transactions on Vehicular Technology, vol. 42, No. 1, Feb. 1993, pp. 14-20.

Mobile Cellular Telecommunications, Analog and Digital Systems by W.C.Y. Lee, McGraw-Hill, Inc., pp. 266-280.

A. Gamst, Application of Graph Theoretical Methods to GSM Radio Network Planning, CH 3006-4/91/0000-0942, 1991 IEEE, pp. 942-945.

K.N. Sivarajan, R.J. McEliece, J.W. Ketchum, Channel Assignment in Cellular Radio, GTE Laboratories: CH2379-1/89/0000/0846, 1989 IEEE, pp. 846-850.

A. Gamst, W. Rawe, On Frequency Assignment in Mobile Automatic Telephone Systems: Phillips GmbH Forschungslaboratium, Hamburg, Germany, CH 1819-2/82-0000-0305, 1982 IEEE, pp. 309-315.

J. Plehn, Applied Frequency Assignment, DeTeMobil, Bonn, Germany, 0-7803-1927-3/94, 1994 IEEE, pp. 853-857.

M. Grevel, A. Sachs, A Graph Theoretical Analysis of Dynamic Channel Assignment Algorithms for Mobile Radiocommunication Systems, Siemens Forsch-u. Entwickl.-Ber. Bd. 12, 1983, Nr.5 © Springer-Verlag 1983 ,pp. 298-305.

Z. Xu, P.B. Mirchandani, Virtually Fixed Channel Assignment for Cellular Radio-Telephone Systems: A Model and Evaluation, ICC '92, 92CH3132-8/0000-1037, 1992 IEEE, pp. 1037-1041.

T.J. Kahwa, N.D. Georganas, A Hybrid Channel Assignment Scheme in Large-Scale, Cellular-Structured Mobile Communication Systems, IEEE Transactions on Communications, vol. Com-26, No. 4, Apr. 1978, pp. 432-438.

D.C. Cox, D.O. Reudink, Increasing Channel Occupancy in Large-Scale Mobile Radio Systems: Dynamic Channel Reassignment, IEEE Transactions on Vehicular Technology, vol. VT-22, No. 4, Nov. 1973, pp. 218-222.

* cited by examiner

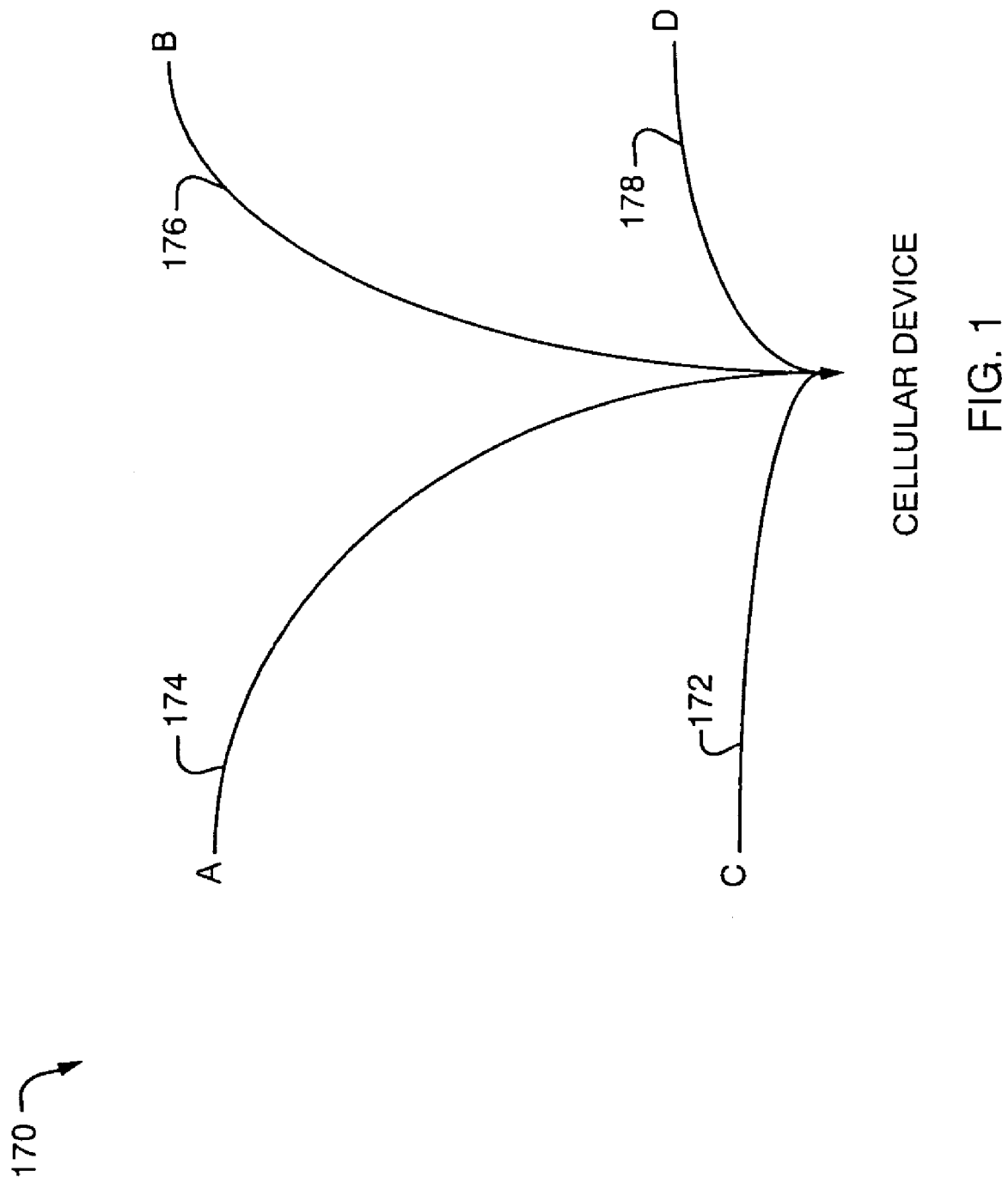

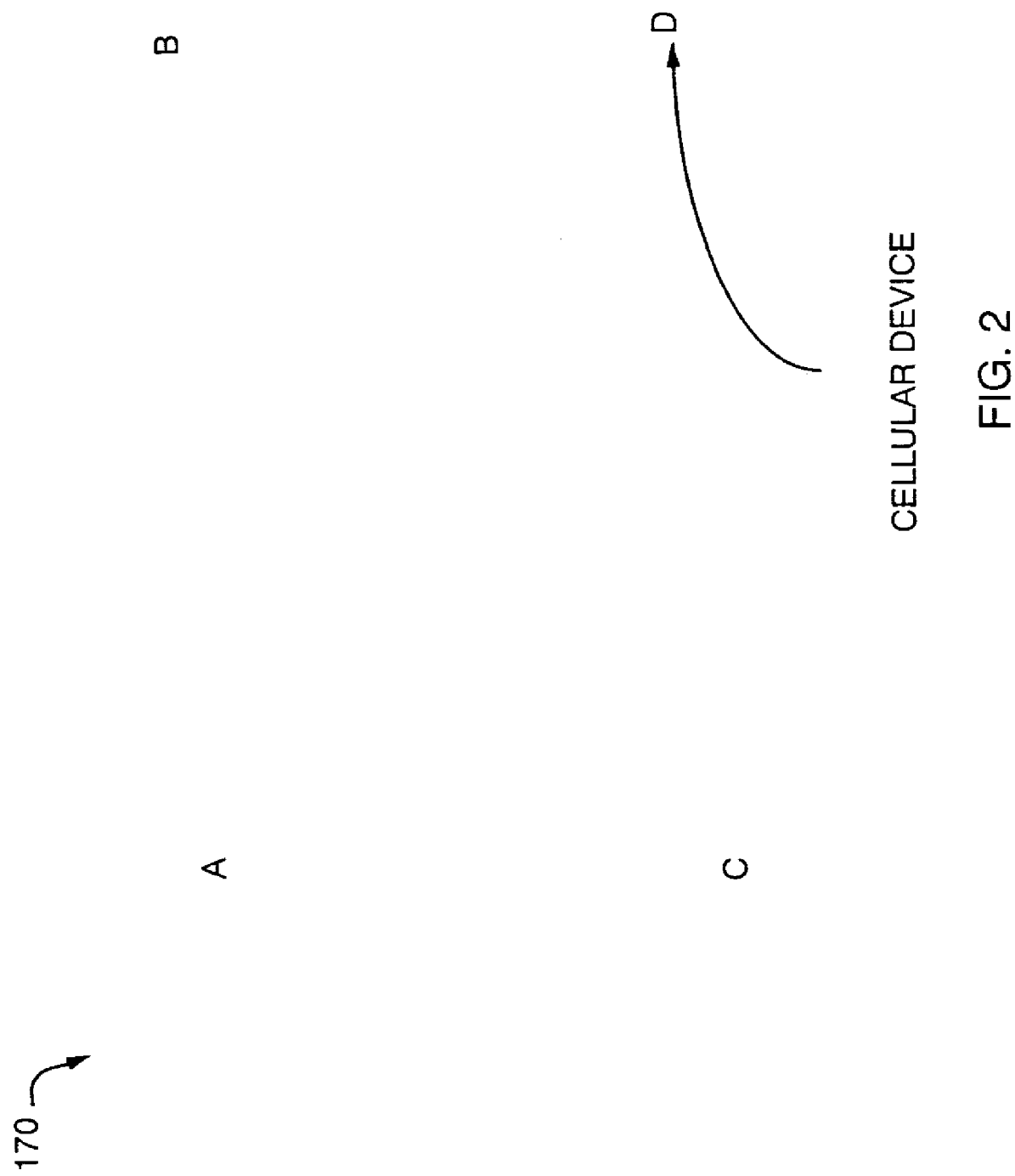

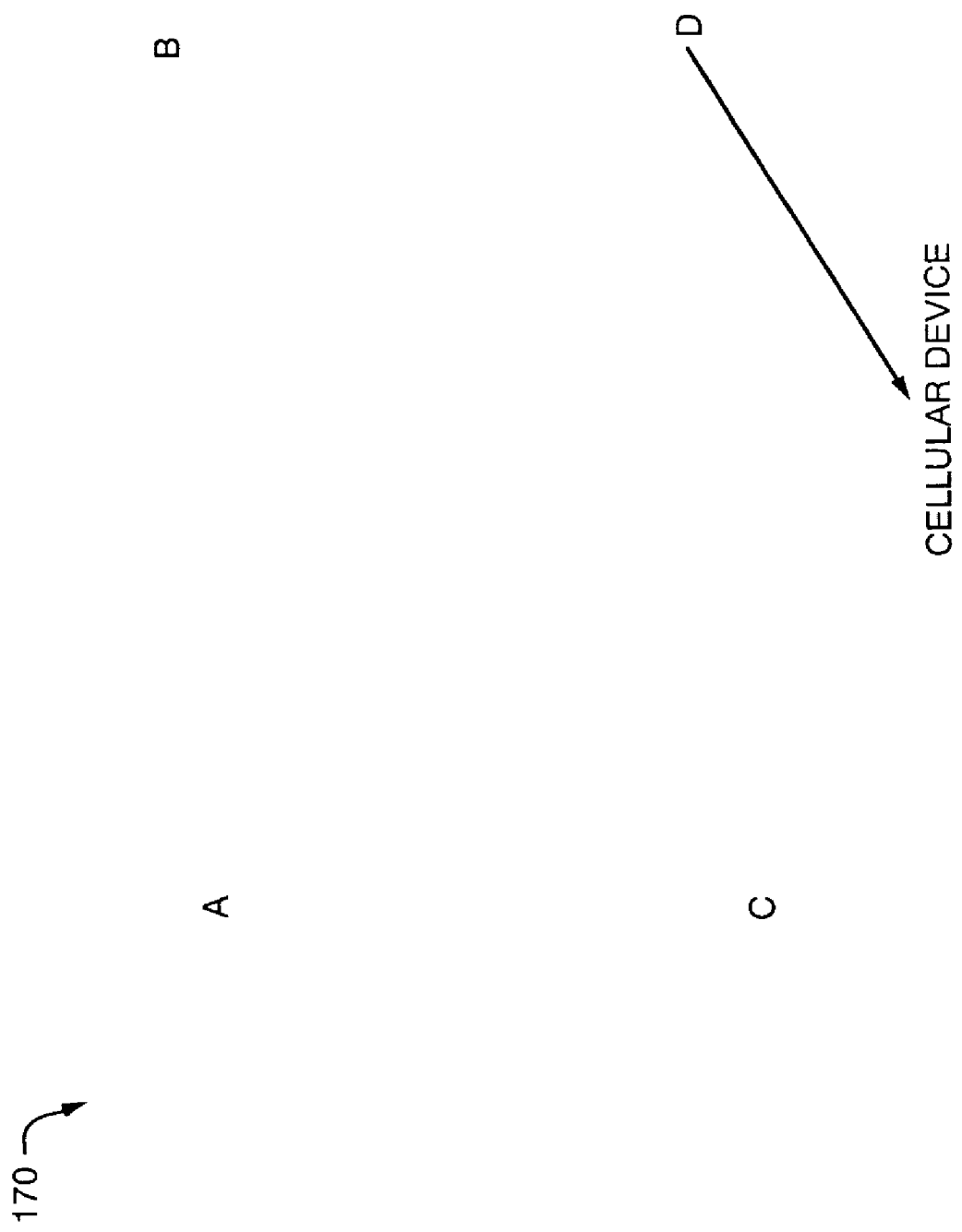

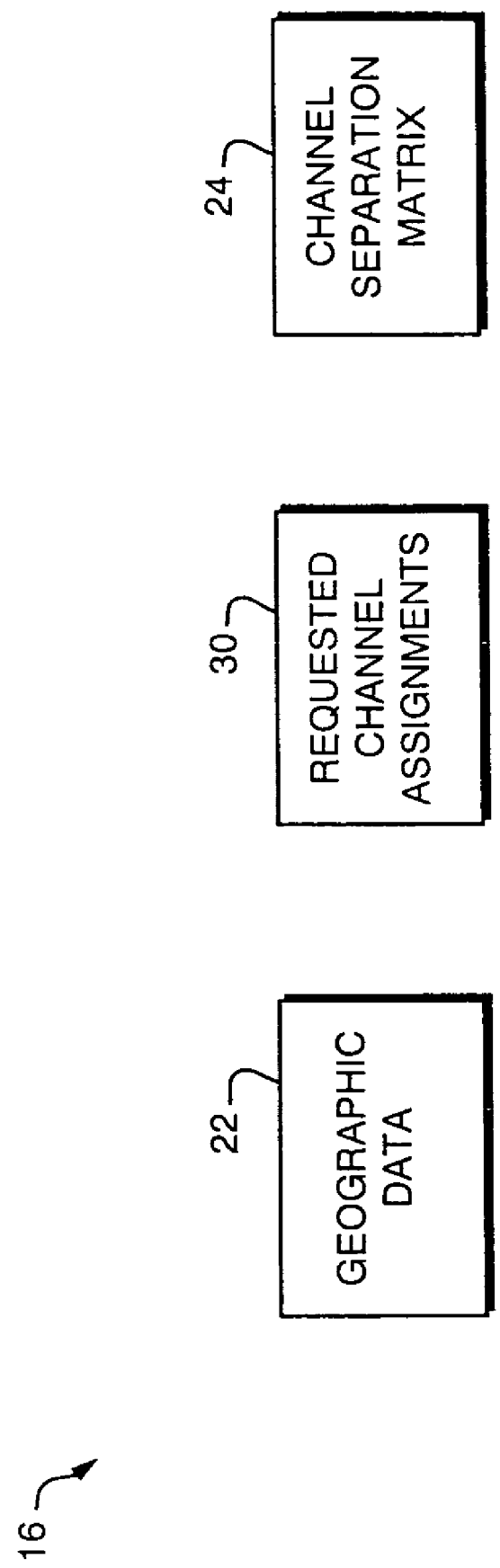

$$602\left\{\overbrace{g_{ijkl}}^{604} = \overbrace{|f_{ik} - f_{jl}|}^{606} - \overbrace{S_{ij}}^{608} \geq 0\right.$$

$$610\left\{\begin{array}{l} p \sim r \sum_{ijkl} [\max(0, g_{ijkl})]^2 \\ \text{for } f_{ik} \geq \phi, \text{ r is a scaling fact} \end{array}\right.$$

FIG. 18

$$620 \left\{ \overbrace{|f_{ik} - f_{jl}|}^{622} - S_{ij} \geq \phi \right.$$

$$624 \left\{ 1 - \underbrace{\frac{S_{ij}}{|f_{ik} - f_{jl}|}}_{625} \geq \phi \right.$$

$$626 \left\{ 1 - \left( \frac{S_{ij}}{f_{ik} - f_{jl}} \right)^{\overset{628}{2}} \geq \phi \right.$$

$$630 \left\{ 1 - \left( \frac{S_{ij}}{f_{ik} - f_{jl}} \right)^{\overset{632}{2n}} \geq \phi, n \geq 1 \right.$$

$$634 \left\{ P_{kl}^{ij} = \underbrace{\left\{ 1 - \left[ \frac{S_{ij}}{f_{ik} - f_{jl}} \right]^{\overset{632}{2n}} \right\}^{\overset{636}{2m}}}_{633}, m \geq 1 \right.$$

FIG. 20

$$670 \left[ \overbrace{V_{ij}}^{674} = \sum_{k=1}^{di} \sum_{l=1}^{dj} P_{k,l}^{i,j} \right.$$

$$672 \left[ V = \sum_{i}^{N} \sum_{j \geq i}^{N} V_{ij} \right.$$

FIG. 22

700 $\left[ P^{ij}_{kl} \ (\Delta x = (S_{ij})-1) \geq 1 \right.$

702 $\left[ \left( \dfrac{S_{ij}}{(S_{ij})-1} \right)^{2n} \geq 2, n \geq 1 \right.$ 704 $\left[ 2n \ln \left( \dfrac{S_{ij}}{(S_{ij})-1} \right) \geq \ln 2 \right.$ 706 $\left[ n \geq (1/2) \ln 2 / \ln \left( \dfrac{S_{ij}}{(S_{ij})-1} \right) \right.$

FIG. 23

METHODS AND TECHNIQUES FOR PENALTY-BASED CHANNEL ASSIGNMENTS IN A CELLULAR NETWORK

CROSS-REFERENCE TO RELATED APPLICATIONS

This is a continuation of prior U.S. patent application No. 09/957,917, filed Sep. 21, 2001, now U.S. Pat. No. 7,212,822 titled "METHODS AND TECHNIQUES FOR PENALTY-BASED CHANNEL ASSIGNMENTS IN A CELLULAR NETWORK."

BACKGROUND

1. Field of the Invention

This application generally relates to cellular networks, and more particularly to techniques for planning and tuning a cellular network.

2. Description of Related Art

Cellular networks may be used in a variety of applications. For example, cellular networks are used in cellular telephone communications. Cellular networks include, for example, digital and analog cellular networks that operate in accordance with one or more protocols or standards, such as Code Division Multiple Access (CDMA), Frequency Division Multiple Access (FDMA), IS-95, or Advanced Mobile Phone Service (AMPS). Generally, cellular networks are configured prior to operation in accordance with certain quality standards, conditions and constraints. Examples of the foregoing include minimizing interference to base stations or sectors. Additionally, the FCC defines frequency ranges that may be assigned and used for transmissions in cellular networks. A base station may be defined as including one or more sectors. Each sector may be viewed as a point from which, or through which, transmissions within the cellular network may be made.

One problem with cellular networks is how to configure the cellular network having multiple sectors, and assigning or associating channels or frequencies with each of these sectors. In other words, part of the configuration of the cellular network is defining at what frequencies different sectors may operate. Sectors may be assigned channels related to information transmissions, such as cellular telephone calls, as well as particular ones for communications related to transmission set up. This association of one of more of one or more channels or frequencies with each of the sectors is determined prior to operation of the cellular network. Additionally, only certain ranges may be used as defined, for example, in accordance with FCC regulations. The FCC defines bands of frequencies that include a limited number of channels which are divided among the various sectors within the cellular network for transmissions.

In a heavily loaded cellular system, the limited number of frequencies or channels may be a problem. One solution is to reuse certain frequencies and assign the same frequency or channel to more than one sector. However, reusing channels when configuring the cellular network may cause the task of system configuration to become increasingly complex due to the constraints that are considered in system configuration. For example, two sectors which are adjacent may generally not be assigned the same frequency due to the extensive interference and operational problems that may be introduced.

Consequently, part of the process of configuring a cellular network may include determining what frequencies may be reassigned to which sectors while trying to minimize the interference which may be introduced by having multiple sectors or base-stations operating at the same frequency. Determining which frequencies may be reassigned or associated with multiple sectors is considered in accordance with quality of service standards, for example, such that a signal is transmitted at a certain power with minimal interference.

Thus, there is required a technique for configuring a cellular network in accordance with input configurations constraints as well as quality of service constraints to achieve a high degree of quality signals by minimizing the interference in a specific set of output configuration data.

SUMMARY OF THE INVENTION

In accordance with principles of the invention is a method executed in a computer system. An initial channel assignment is performed that includes associating one or more channels with each sector included in a cellular network. A penalty value is calculated representing a quantification of cost associated with the channel assignment if the initial channel assignment does not satisfy predetermined constraints. The initial channel assignment is modified in accordance with the penalty function if the initial channel assignment does not satisfy predetermined constraints.

In accordance with yet another aspect of the invention is a method executed in a computer system for determining a total penalty value for use in performing channel assignments in a cellular network. A penalty function is determined for each pair of sectors, i and j, included in the cellular network, sector i being associated with a frequency k, denoted $f_{ik}$, and sector j being associated with a frequency l, denoted $f_{jl}$. The penalty function is represented as:

$$P_{kl}^{ij} = \left(1 - \left(\frac{S_{ij}}{f_{ik} - f_{jl}}\right)^{2n}\right)^{2m}$$

where n and m are integers greater than or equal to 1, and $S_{ij}$ denotes a constraint for sectors i and j representing a required channel separation. A potential is determined representing a summation of the penalty function between two sectors i and j as:

$$V_{ij} = \sum_{k=1}^{di} \sum_{l=1}^{dj} P_{kl}^{ij}$$

A total penalty value, V, is determined for all sectors and channels included in the cellular network represented as:

$$V = \sum_{i}^{N} \sum_{j \geq i}^{N} V_{ij}$$

In accordance with yet another aspect of the invention is a method executed in a computer system for determining color code. A channel is selected for use in a cellular network. One or more sectors are identified that included in the cellular network and are associated with the channel. A channel assignment technique is used to perform color code assignments to the vectors using the channel wherein the channel assignment technique uses a penalty function in evaluating the color code assignments.

BRIEF DESCRIPTION OF THE DRAWINGS

Features and advantages of the present invention will become more apparent from the following detailed description of exemplary embodiment thereof taken in conjunction with the accompanying drawings in which:

FIG. 1 is an example of an embodiment of a cellular network when a cellular device is turned on initially;

FIG. 2 is an example of the system of FIG. 1 when the cellular device selects a sector for a transmission;

FIG. 3 is an example of the system of FIG. 1 when a cellular device is notified of the selected channel for the transmission;

FIG. 5 is an example of an embodiment of the input configuration data;

FIG. 18 is an example of formulas used in expressing a penalty function;

FIG. 20 is an example of formulas used in deriving a penalty function;

FIG. 22 is an example of formulas used in expressing a summation penalty function with contributions summed over multiple channels for multiple pairs of sectors;

FIG. 23 is an example of formulas expressing ranges for a selection of an integer value used in the penalty function;

DETAILED DESCRIPTION OF PREFERRED EMBODIMENT

Figure 4A:
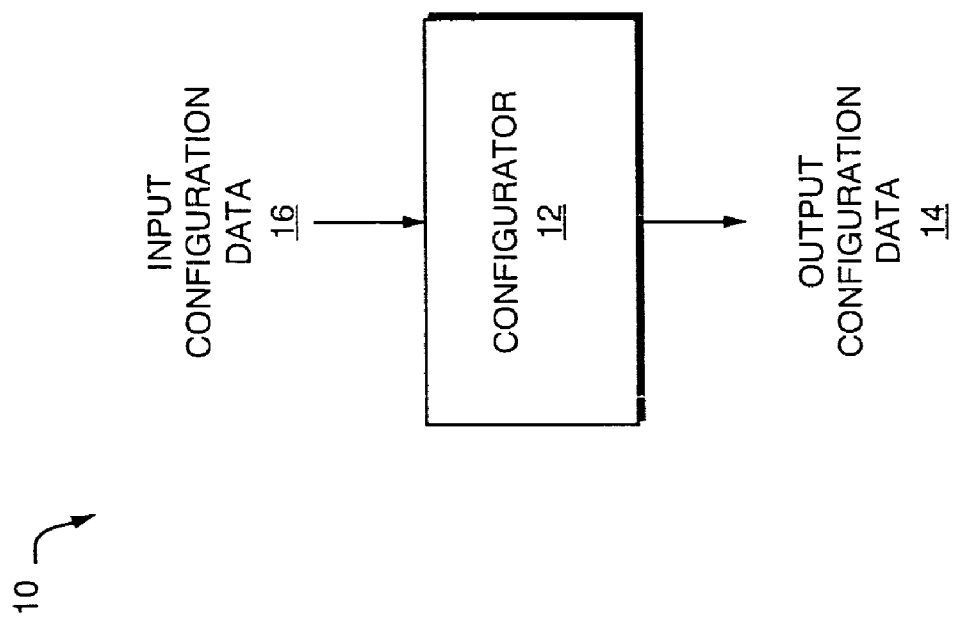
FIG. 4A is an example of an embodiment of a system that may be used to configure a cellular network.

Referring now to FIG. 1, shown is an example of an embodiment of a system of a cellular network. The system 170 includes four sectors or base stations A, B, C and D. Shown in FIG. 1 is the operation of transmission within the system 170 when a cellular device is turned on. The signals 172, 174, 176 and 178 are transmitted by each of the sectors or base stations to the cellular device. Generally, the cellular device turns on and "listens" for signals 172-178 as transmitted from each of the sectors.

It should be noted that the cellular device may include, for example, a cellular telephone or other device which transmits signals in a cellular network. Each of the sectors A through D have stations that operate within the cellular network 174 for transmissions between the cellular device and the sectors, such as making telephone calls from a cellular telephone.

It should be noted that other embodiments of a system 170 may include more base stations and sectors, as well as include multiple cellular devices in operation. The system of FIG. 1 is shown for simplicity as including only four sectors and a single cellular device in operation.

Referring now to FIG. 2, shown is a "snapshot" of the system 170 after a cellular device is turned on and listens to signals from sectors A through D. Once the cellular devices receives a signal from each of the sectors, the cellular device selects one of the sectors for handling its transmission. As shown in FIG. 2, this selection is performed by the cellular device transmitting a signal to one of the sectors. In one embodiment, the selection may be based in accordance with the strength of the signals sent from each of the sectors. The cellular device may, for example, select the sector having the strongest signal transmission as detected by the cellular device.

Referring now to FIG. 3, shown is an example of an embodiment of system 170 with the cellular device being notified by the selected sector of the selected channel assignment for transmissions between the cellular device and the sector. The sector chooses one of the assigned frequencies or channels associated with the selected sector. These channels associated with each sector may be predetermined in accordance with criteria prior to operation of the cellular network 170. The sector communicates to the cellular device as to the selected channel for use in transmitting signals to and from the cellular device.

It should be noted that the embodiment of the system 170 in FIGS. 1 through 3 is an example of a communications or transmission protocol that may be used in communicating with a cellular device. It should be noted that prior to operation as in performing the signal transmissions between the base stations or sectors and a cellular device in operation, the system 170 must be properly configured in accordance with selected sets of channel assignments or frequencies. In particular, each of the base stations A, B, C and D are associated with a set of frequencies or channels which may be assigned or used when transmitting to and from a cellular device as indicated in the system of FIGS. 1 through 3 when a cellular device is in operation.

As known to those skilled in the art, the FCC defines certain channels or frequencies that may be assigned or used in transmissions within a cellular network. There is a relatively small number of channels or frequencies that may be assigned. Thus, part of the problem of configuring the system 170 includes how to divide the different channels that are used within the cellular network. Various tools, such as GRANET ("Graphical Radio Network Engineer Tool") as used by GTE Corporation may be used to configure and tune cellular systems, such as the system 170 of FIGS. 1-3.

What will be described in paragraphs that follow are techniques for tuning and configuring this system in accordance with certain input data and criteria or constraints. For example, the constraints may relate to quality of service, such as requiring information transmissions to be of a certain power level. Various input configuration information, such as the geographic constraints, is also considered when doing channel assignments and information transmissions. It should be noted that other constraints and input may be considered as known to those skilled in the art, for example population, in a particular area. Population may be an indicator of the number of channel assignments required for a particular sector.

Figure 4B:
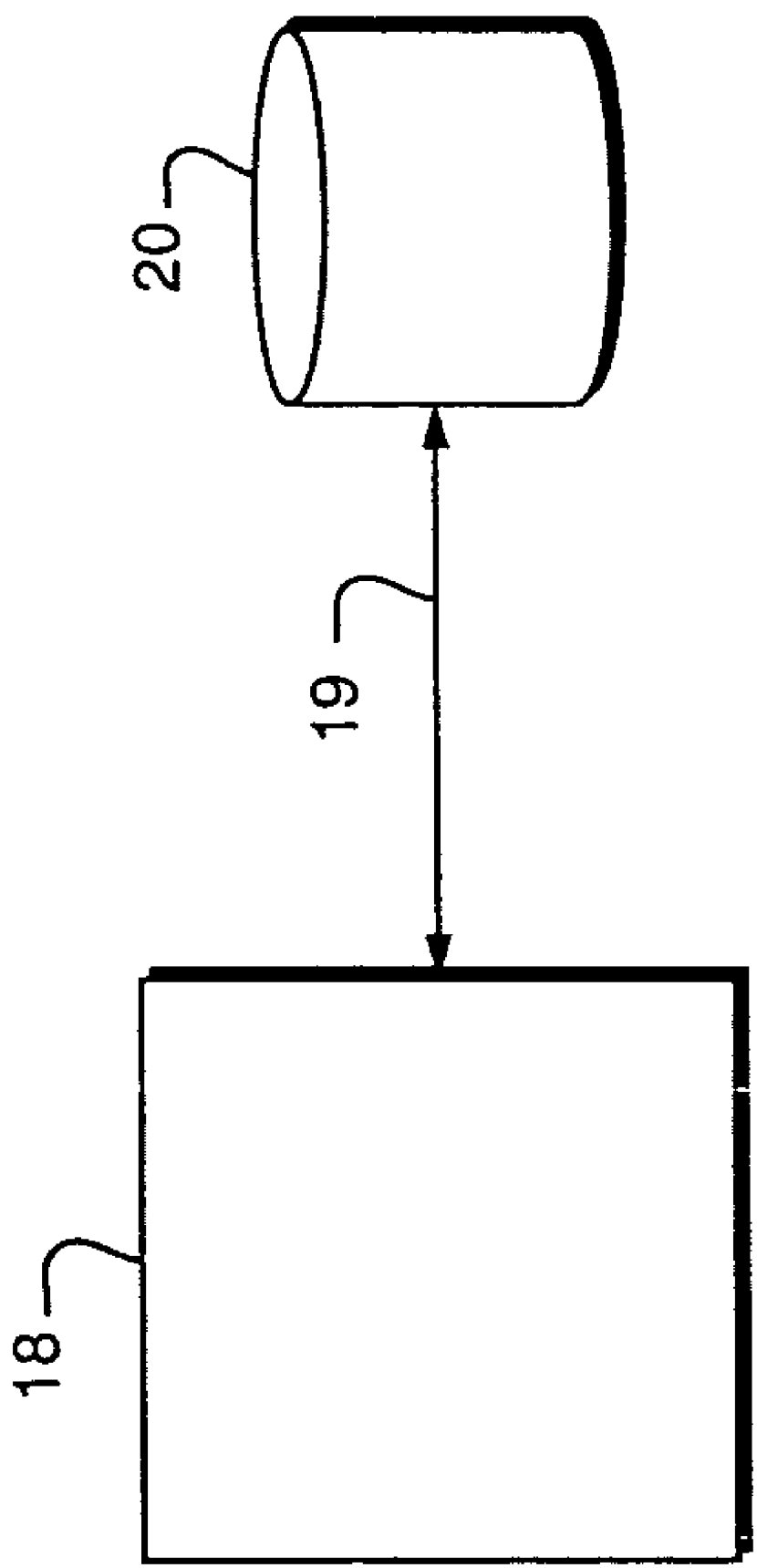
FIG. 4B is an example of an embodiment of a computer system as may be used to produce portions of a cellular network configuration tool.

Referring now to FIG. 4, shown is an example of an embodiment of a system 10 that may be used to configure the cellular network 170 of FIG. 1. The system 10 includes input configuration data 16 which is input to a configurator 12 producing output configuration data 14. The input configuration data, as previously described, may include constraints of a particular system, as well as quality of service (QOS) parameters or requirements. This will be described in more detail in paragraphs that follow. Given a particular set of input configuration data, the configurator 212 produces an output configuration data set 14. Generally, the output configuration data 14 is that information which is needed to configure the particular sectors such as those A through D in the system 170 operating in the cellular network. In particular, the output configuration data includes one or more channels selected and associated with a particular sector. As previously described, these channel assignments or frequencies are those which may be used by the various sectors in transmissions between a cellular device operating within a cellular network 170.

Referring now to FIG. 4A, shown is an example of an embodiment of a system which may be used in producing a configuration for the cellular network 170 of FIG. 1. In this particular embodiment, the configurator 12 as well as the input configuration data 16 and output configuration data 14 may reside on a storage device 20 connected by connection 19 to computer system 18. The computer system 18 may be any commercially available processor such as an Intel based personal computer or other commercially available computer system in accordance with each particular implementation. The communication connection 19 may be a network connection or other type of connection between a storage device 20 and a computer system 18 upon which a configuration 12 may be executed to produced the output configuration data 14. It should be noted that portions of the configuration 12 which should be described in paragraphs that follow may be implemented in software and/or hardware. Those particular portions which are software may be located and stored in a storage device such as 20 and transferred for execution to computer system 18 through connection 19. A variety of different types of connections 19 are known to those skilled in the art and may vary with each particular embodiment.

It should also be noted that, similar to the variety of network connections and computer systems that may be used in a particular embodiment, a variety of data storage devices 20 may be included in the particular embodiment as known to those skilled in the art.

Referring now to FIG. 5, shown is an example of an embodiment of different classifications of input configuration data 16. Input configuration data 16 includes geographic data 22, with requested channel assignments 30, and the channel separation matrix 24. Generally, the geographic data 22 may include a variety of information describing the geographic locale, such as the terrain of an area, which may be used in propagation modelling, as well as particular antenna characteristics as used in operation within a particular sector. Additionally, input information related to geography may include information about population as well as various land characteristics. In this particular embodiment, the geographic data includes base station or sector location information, such as longitude and latitude and tower height. Also included in the geographic data is a representation of the contour of the land, for example, in the form of raster maps. Additionally, geographic data may include information regarding the elevation of the land as well as land use and cover, such as whether a particular area is residential, an orchard, or over water.

Generally speaking, the input configuration data includes that input information which may be relevant to a particular embodiment and should be considered when determining the configuration of the cellular network. Requested channel assignments 30 is basically a request of the number of frequencies or channels to be associated with each particular base station or sector. Generally, channel assignments may be determined for example by estimation using the population information or it may be alternatively be based on past use. It should be noted that the types of information included in each of the foregoing may vary with embodiment in accordance with each particular application and implementation.

The channel separation matrix 24 is a representation of the minimum channel separation between any two base stations or sectors. In this particular embodiment in the channel separation matrix 24, an N×N dimensioned matrix may be used. In this embodiment there are N base stations or sectors. Each entry in the matrix represents the minimum channel separations between the two sectors as indicated by, respectively, a particular row and column pair. Typical entries in the matrix are one of a 0, 1 or a 2. A channel separation of 0 indicates there is no separation between frequencies or channels that may be assigned to particular base stations. A 1 indicates that there must be at least a plus or a minus of 1 channel difference in assignments between two particular sectors. Similarly, a 2 indicates that no adjacent sectors may be assigned the same frequency or channel.

Generally, the term "neighbor" is used to describe how one sector and its base stations relates to another sector and its base stations. It is generally known in the art that if a call may be "handed off" to a sector from another sector, those two sectors may qualify as neighbors. With regard to the channel separation matrix, a neighbor may be reflected in the channel separation matrix by a minimum separation of 2 indicated between a pair of sectors or base stations.

Figure 6:
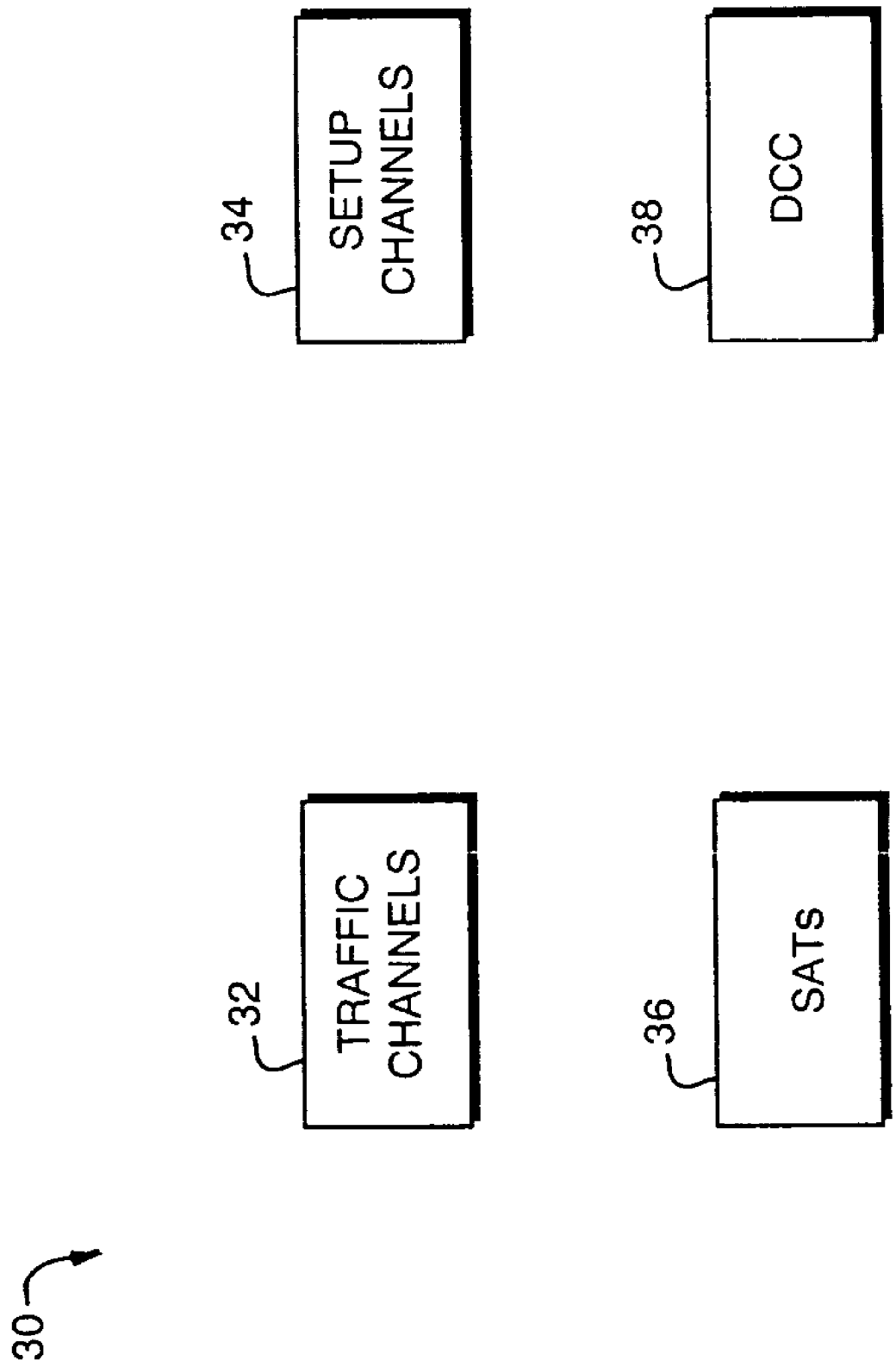
FIG. 6 is an example of the partitioning of channel assignments.

Referring now to FIG. 6, shown is an example of an embodiment of the four sets of channel assignments that may be performed within an embodiment of the system of the cellular network 170. In other words, the configurator tool 12 may be used to select particular channels or frequencies and accordingly associate them with different sectors. For example, in AMPS, the four sets of channel assignments include traffic channels 32, set-up channels 34, Supervisory Audio Tones (SATs) 36, and Digital Color Codes (DCC) 38.

Generally, traffic channels 32 are those channels or frequencies assigned or associated to a particular sector for transmissions when in operation. These channels may generally be described as operation transmission frequencies, for example, those frequencies that may be used in information transmissions between a cellular device and a sector during transmission of a cellular telephone call. Set-up channels 34 are those channels each associated with a sector at which the sector may operate to set-up an initial communication with a cellular device. For example, referring to FIG. 1, each of the transmissions 172 through 178 operate at a particular set up frequency or channel associated with each of the base stations A through D. Generally, the techniques that will be described to configure the traffic channel calls may also be used to configure the set-up channels.

The SATs are generally an assignment of one of three particular tones associated with each frequency or channel assigned, and assist with the identification of a particular base station or sector. The DCCs relate to the set-up channels between a base station and a handset or cellular device. The DCC is two bits of information assigned to each set-up channel and placed into in the transmission stream.

Figure 7:
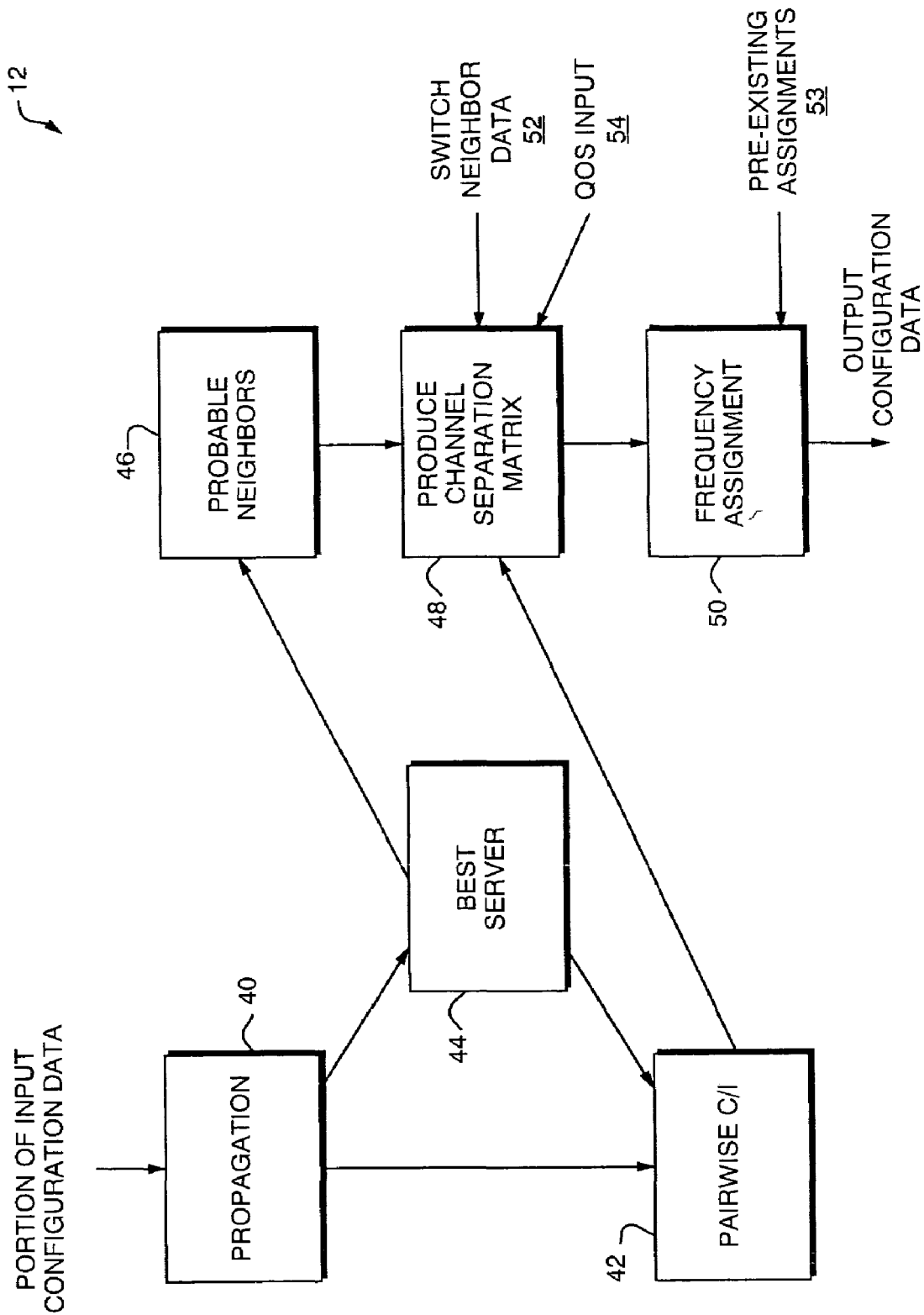
FIG. 7 is an example of the embodiment of the configurator of FIG. 4.

Referring now to FIG. 7, shown is an example of an embodiment of the configurator 212 of FIG. 4. Generally, FIG. 7 shows a flow diagram of the various components and how they operate and interact within the configurator 212. This embodiment of the configurator 212 includes a propagation module 40, a pairwise C/I module 42, a best server module 44, a probable neighbors module 46, a channel separation matrix module 48, and a frequency assignment module 50. Input to the propagation module includes a portion of the input configuration data, such as geographic data. Generally, the propagation module 40 determines how strong a signal from a sector, or base station from within a sector, is from any place in a region. This propagation or signal strength is used to compute path loss. Information regarding signal strength is input to the best server module 44 and the pairwise C/I module 42. This best server module 44 may determine the best server regions for the operation of the cellular network. In other words, the best server module 44 determines which base stations or sectors may best handle an incoming call or transmission in accordance with the signal strength as determined by the propagation module 40.

The best server region indicates for a particular area what base station or sector is best suited to handle or serve calls from that particular region. The best server region module 44 is used to determine the best sector to serve or handle an incoming call in accordance with signal strength. The pairwise C/I module 42 performs determinations in accordance with hypothetical or simulated conditions, e.g., a "what if" scenario, that are considered when assigning frequencies or channels. The pairwise C/I module 42 determines the strength of a signal transmitted at a frequency if sectors A and B are both assigned the same frequency and if no other frequencies are assigned. Generally, the pairwise C/I considers what the strength of a signal from a first sector operating in a first frequency or channel in conjunction with the interference generated by a second sector also operating at that same frequency or channel. Generally, the pairwise C/I considers the hypothetical situation in this assignment as a condition in determining whether to perform a certain frequency assignment as an input to the frequency assignment module 50. Determining frequency assignments from the pairwise C/I module 42 is used by looking at each point in a best server region and considering the strength of the desired or carrier signal as well as the strength of the interference. This will be described in more detail in paragraphs that follow. It should be noted that the pairwise C/I requirements produced by the pairwise C/I module 42 in considering frequency assignments relate to quality of service. In other words, the pairwise C/I module 42 produces hypothetically input in accordance with a particular channel assignment configuration. This may generally be viewed as an estimation of interference as related to a particular frequency assignment. This is considered as an input to the produce channel separation matrix module 48 in conjunction with the quality of service input 54 which dictates, for example, quality of service required for a particular system configuration. The pairwise C/I module 42 considers the interference components for hypothetical pairs of frequency assignments.

Output produced by the best server module 44 is also input to the probable neighbors module 46. Generally, the probable neighbors module 46 may be used to produce input to determine what two sectors are, or may be considered, "neighbors". This is used as input in producing the channel separation matrix by the channel separation module 48. Additionally, switch neighbor data 52 may also serve as an input in producing the channel separation matrix by module 48. Generally, switch neighbor data is a snapshot of the channel separation as known to the existing switching systems as may be included in an embodiment of the system 170 of FIG. 1. It should be noted that both actual switch neighbor data 52 as well as output from the probable neighbors module 46 may serve as input to the module 48 in producing the channel separation matrix. The switch neighbor data 52 represents the actual description of what sectors are considered neighbors by the switches currently in operation. However, it is often the case that an embodiment may want to add sectors or base stations. Thus, performing using the actual switch neighbor data 52 does not suffice to accurately describe the neighbor relationship between all sectors in this instance. For example, where an additional base station or sector is to be added, input for this future configuration may come from the probable neighbors module 46 and serve as input for module 48 to produce the channel separation matrix as previously described.

In this embodiment, the channel separation matrix may include information as will be described below. Generally, two sectors have a minimum separation of 2 if a call can be "passed off" between the two sectors, qualifying the two sectors as neighbors. If two sectors have the same neighbor, for example sectors C and D may have a common neighbor A, then C and D have a separation of 1 as may be indicated in the channel separation matrix. Otherwise, a zero (0) is indicated as an entry in the channel separation matrix by the switch neighbor data 52. A channel separation matrix may be used as an input to the frequency assignment module 50. Generally, the frequency assignment module 50 takes into account those sectors which are neighbors using the channel separation matrix. The frequency assignment module 50 uses this information to produce a configuration of channel assignments associated with each particular sector, for example, in producing the traffic channel assignment set 32.

In one embodiment, the pairwise C/I is an input into the produce channel separation matrix module 48. QOS input may be used to modify separation requirements to the channel separation matrix by making the channel assignment requirements more stringent. This modification of an entry in the channel separation matrix, (Sij) may be denoted as follows, in which i and j represent indices of an entry in the channel separation matrix, as previously described. The following subscript of "QOSCO" corresponds to the co-channel QOS input:

$$\text{if } (C/I)_{i,j} < (C/I)_{QOSCO} \text{ then } S_{i,j} = \text{MAX}(S_{i,j}, 1)$$

The foregoing representation of the co-channQOS input represents that a given entry in the channel separation matrix (S) for a pair i,j (denoted by subscript i,j) may be modified to be more stringent requiring a greater channel separation. As noted above, this is the maximum of either the current value of the channel separation matrix for a given pair, i,j, or a separation of 1. Generally, as will be described in more detail, co-channel C/I may be computed for each channel i assigned in a sector j producing some carrier power to some interference power. Similarly, adjacent channel C/I refers to a carrier power to some interference power ratio with respect to adjacent channel i−1 or channel i+1 being assigned to a sector j.

The following represents a similar relationship for the adjacent channel C/I for a given pair, i,j:

$$\text{if } (C/I)_{i,j} < (C/I)_{QOSADJ} \text{ then } S_{i,j} = \text{MAX}(S_{i,j}, 2)$$

It should be noted that further adjustments to the channel separation matrix may be done, for example, by user overrides. In one embodiment, for example, there may be additional hardware restrictions related to base station operation requiring a channel separation of 12. Thus, the user may further override the foregoing channel separation matrix assignments or any other technique for producing a channel separation matrix by "hardwiring" or always setting particular entries of the channel separation matrix in accordance with system hardware and other restrictions that may vary with embodiment and implementation. The pairwise C/I and cochannel and adjacent channel C/I are described in more detail in other portions of the specification.

The frequency assignment module 50 outputs configuration data, for example, such as traffic channel configuration information 32 of FIG. 6 which associate each particular sector with one or more frequency or channels for transmissions. Each of the components for the system 12 of FIG. 7 will be described in more paragraphs that follow.

Figure 8:
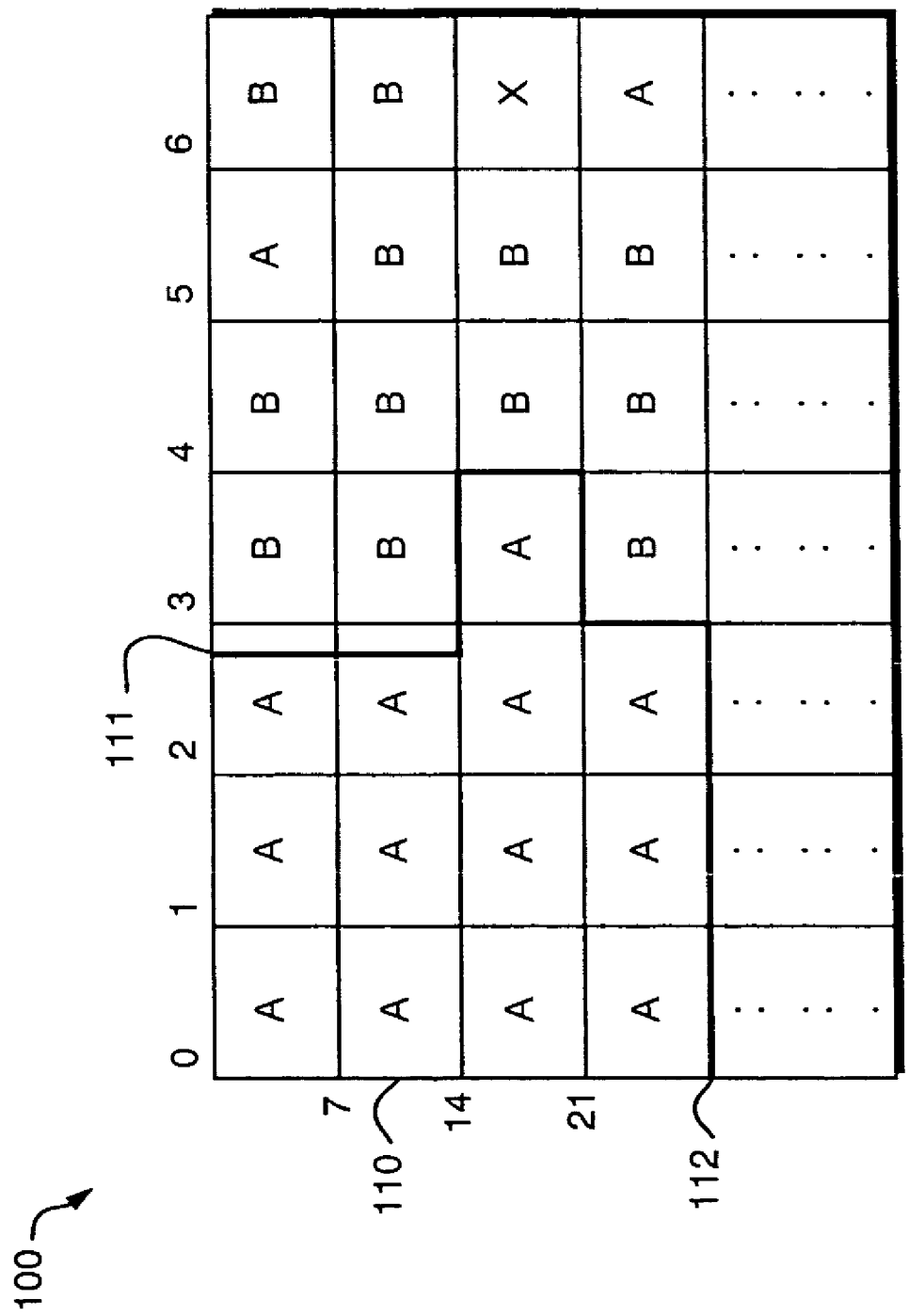
FIG. 8 is an example of an embodiment of a best server map.

Referring now to FIG. 8, shown is an example of an embodiment of the best server map. The best server map 100 in FIG. 8 includes information about what is the best server for handling a particular call in a region within the cellular network. The representation of the best server map 100 includes a cell associated a particular portion of geographic area. For example, in the best server map 100, a global geographic area is associated with cell 2 for which sector A is indicated as the best server. Similarly, sector A is indicated as the best server associated with the geographic area of cell 17. However, sector B is indicated as the best server for the geographic area associated with cell 3, 4 and 18. It should be noted that some particular geographic areas, such as indicated by geographic area 20, in this representation with an X has no best server associated with that particular geographic location.

It should also be noted that indication of the same best server may be scattered throughout the best server map. In other words, there are areas or portions of the best server map which may not be contiguous in representing those portions for which A, B C, or D are the best servers. For example, note that cell number 5 contains an A and cell numbers 3 and 4 contains B's. Thus, those geographic areas associated with cell number 5 indicate A is the best server. However, this is separate from, and not contiguous with, that portion of the map defined by 110 which includes a block or group of cells shown in the left portion of the map 100. In particular, the area 110 represents a contiguous portion of the best server map for which A has been designated the best server. This portion 110 is disjoint and separate from other single cells, such as cell number 5 and cell number 27 that also indicate A as the best server.

Generally, such disjoint representations may occur, for example, due to various geographic details such water, land or particular urban areas. For certain geographic locations such as those with certain elevation or mountainous terrains, there may be disjoint best server groupings or gaps between those geographic areas associated with the same best server.

Figure 9:
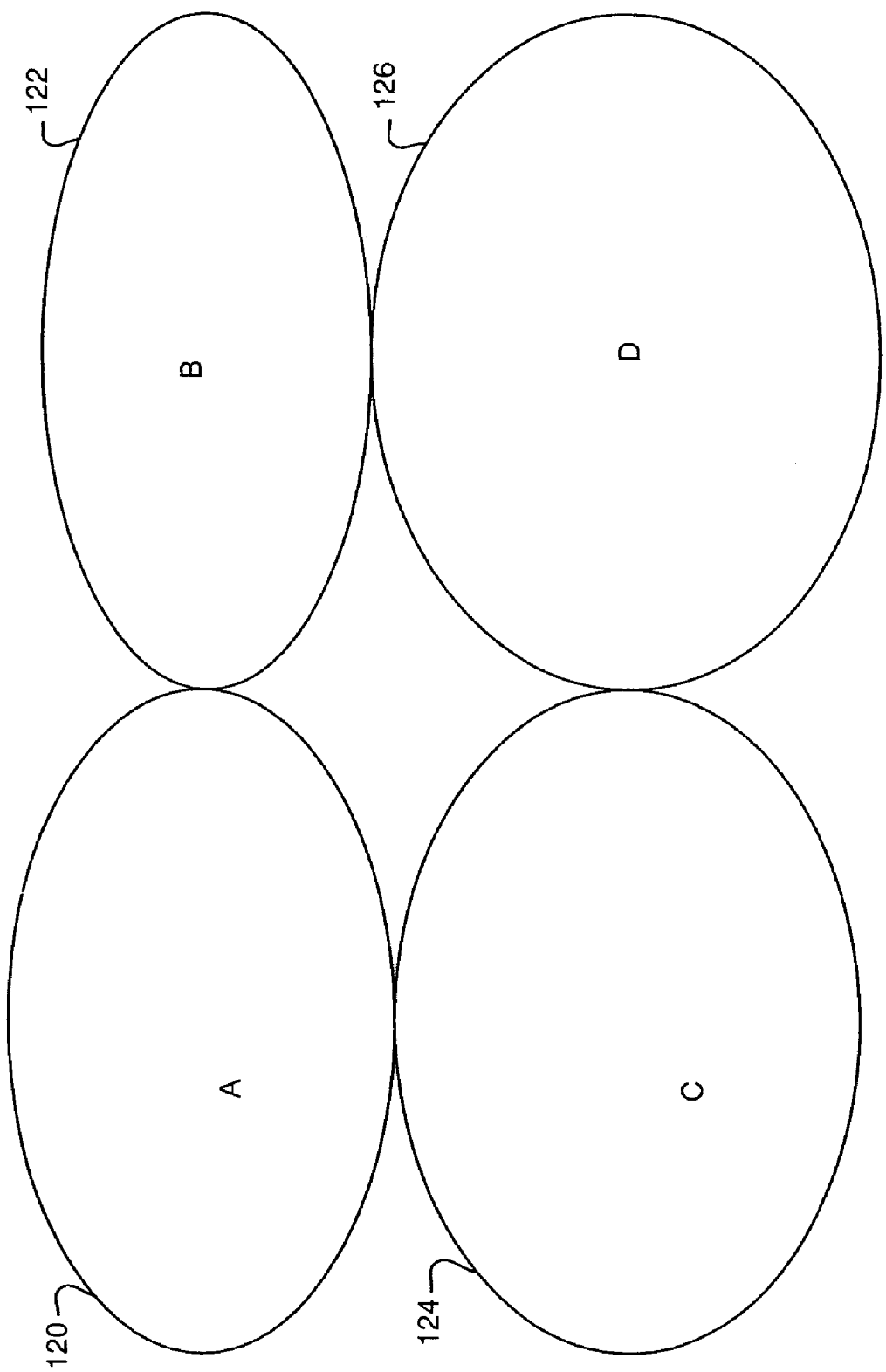
FIG. 9 is an example of an embodiment of the representation of the best server regions.

Referring to FIG. 9, shown is an example of a pictorial representation of the best server regions. The best server regions for each of the sectors or base stations A through D are indicated respectively by the circular regions 120 through 126. It should be noted that this representation indicates only contiguous areas in a smooth fashion. However, as previously discussed in conjunction with FIG. 8, it is often the case that best server regions are not representable in such graphic representation as ideally given in FIG. 9, for example, due to the disjoint best servers regions associated with a particular geographic location.

Figure 10:
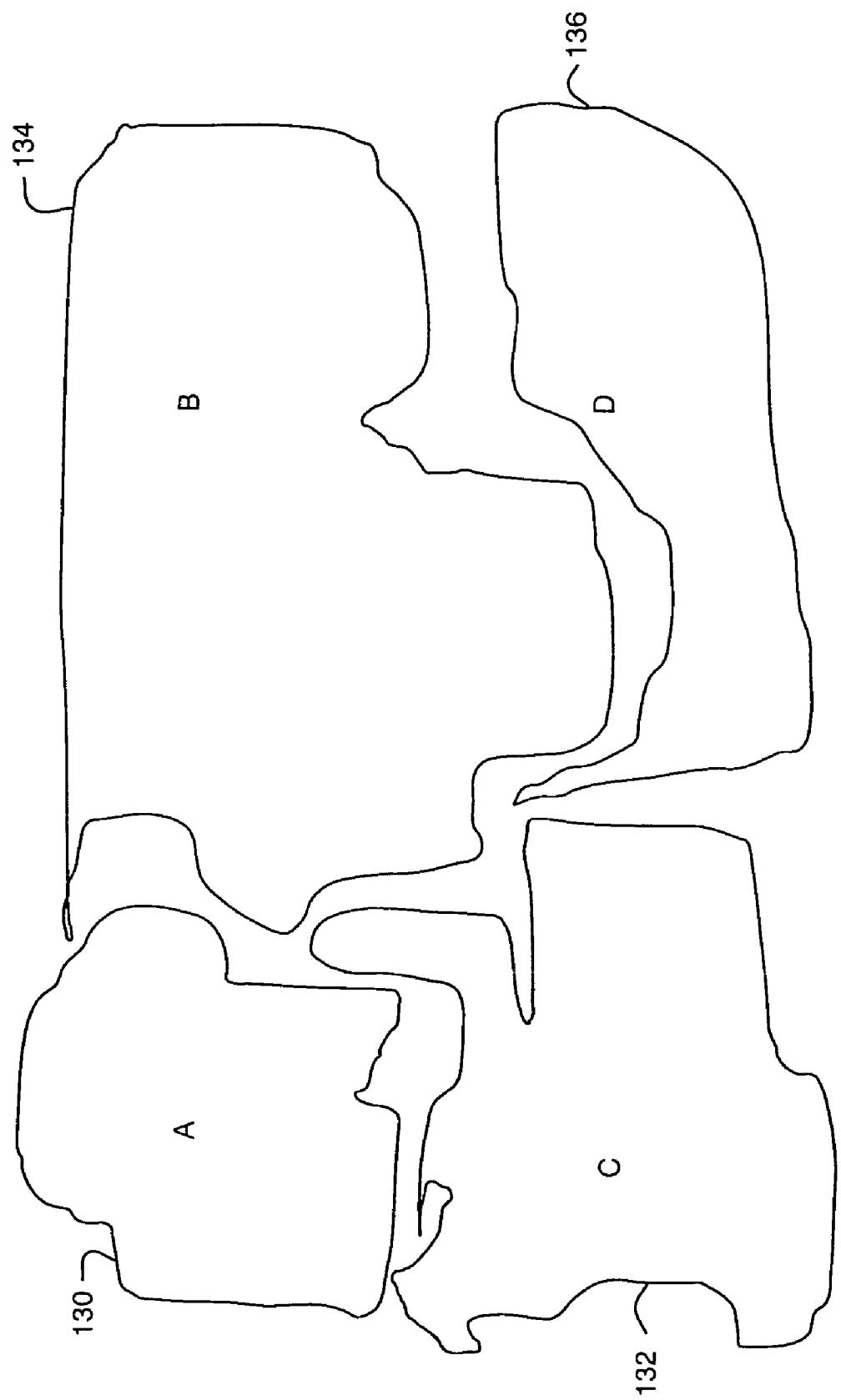
FIG. 10 is another example of an embodiment of the representation of the best server regions.

Referring to FIG. 10, shown is another example of a pictorial representation of the best server region associated with each of the sectors A through D as included in the system 170 of FIG. 1. Note the difference between the regions 130 through 136, respectively, with those regions indicated by 120 through 126.

Figure 11:
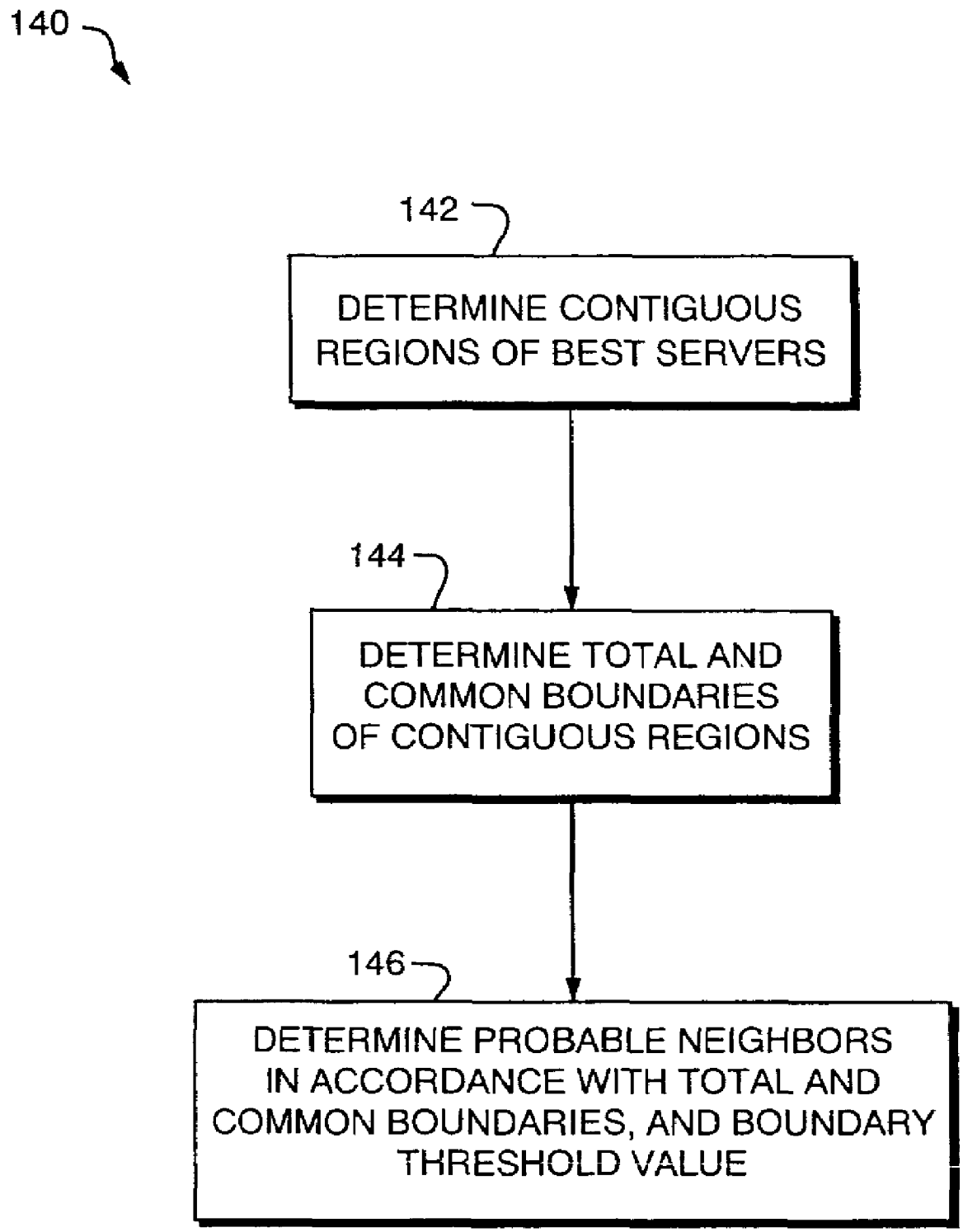
FIG. 11 is an example of an embodiment of a flowchart of a method of how to determine probable neighbors.

Referring to FIG. 11, shown is an example of flowchart of the methods steps for determining probable neighbors. Generally, the method steps of FIG. 11 in flowchart 140 are those that may be performed by the probable neighbors module 46 in determining which pairs of sectors are probable neighbors. As previously described, the probable neighbors module 46 implements a technique which is intended to be used when the switch data 52 may be unavailable or out of date for a particular sector being considered. As previously described also, this may be used as an alternative, for example, when a new sector is being added for which there is currently no active switch data 52 available.

At step 142, the contiguous regions of the best servers are determined. As previously described in conjunction with FIG. 8, in this embodiment the best server map is examined to determine which portions are contiguous within the map indicating a contiguous region or geographic area for which a common best server has been indicated. This may be indicated for example by the graphical representation of portion 110 of map 100 which indicates A as the best server for the associated geographic area.

At step 144, the total and common boundaries of the contiguous regions are determined. In other words, the total boundary for a particular contiguous region such as 110 is determined. This may be indicated, for example, by the darkened line surrounding the portion 110 of map 100, indicating the total boundary for this contiguous region. Also determined at step 144 is that portion of the boundary which is common between two contiguous regions in which each contiguous indicates a different server. In this example, line 111 indicates a common boundary for example between the contiguous area 110 and another contiguous area which has not been defined and determined in the best server map 100.

At step 146, probable neighbors are determined in accordance with total and common boundaries as well as a predetermined boundary threshold value. What will now be described in paragraphs that follow are more detailed descriptions for the steps of the flow chart 140 of FIG. 11.

Figure 12:
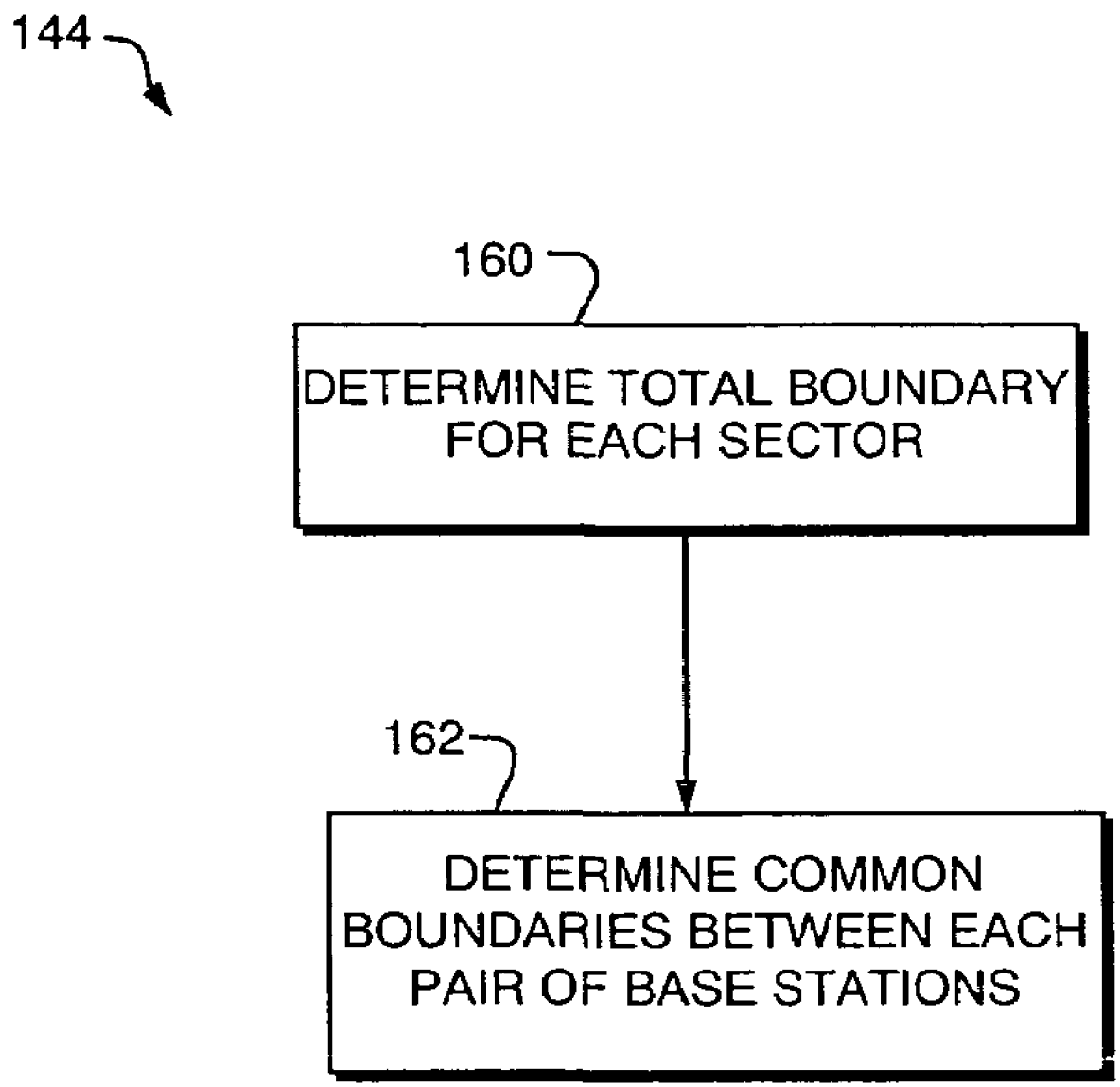
FIG. 12 is an example of an embodiment of a flowchart of the method steps for determining total and common boundaries for contiguous regions.

Referring now to FIG. 12, shown is a flowchart of an embodiment of a more detailed step 144 for determining total and common boundaries of contiguous regions. At step 160, the total boundary is determined for each sector. In other words, at step 160, a total boundary or quantitative representation is determined representing the boundary conditions for each sector as indicated in the best server map 100. At step 162, the common boundaries between each pair of sectors are determined.

Figure 13:
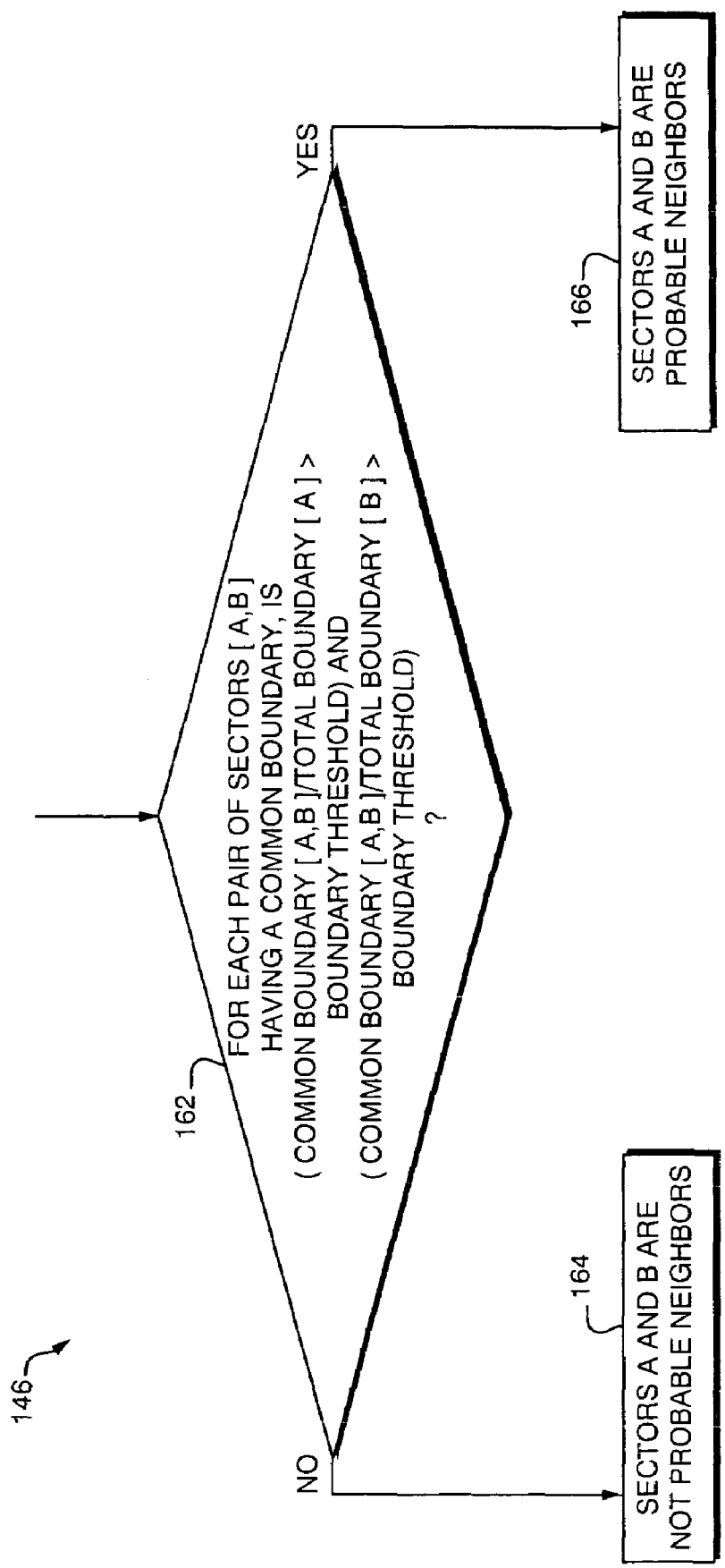
FIG. 13 is an example of an embodiment of a flowchart of determining probable neighbors in accordance with total and common boundaries and a boundary threshold.

Referring now to FIG. 13, a flowchart is shown to include more detailed steps for determining probable neighbors in accordance with total and common boundaries as well as a predetermined boundary threshold value as indicated in step 146 of the flowchart 140. At step 162, it is determined for each pair of sectors A and B having a common boundary the ratio or percentage of common sector boundary to total sector boundary. In other words, a percentage is arrived at with the numerator as the common sector boundary over the total sector boundary for each pair of sectors A and B. In one particular embodiment, the total sector boundary may be either the total sector boundary regarding best server A or the total sector boundary regarding best server B. One embodiment may consider the minimum of the total sector boundary of either A or B. Another embodiment may take the maximum of the total sector boundary of either A or B. Other embodiments may use other values in the ratio. At step 162, a decision is made comparing each of these percentages or ratios for a pair of sectors having a common boundary to a predetermined boundary threshold.

At step 162, it is determined for each pair of sectors A and B having a common boundary, is the common boundary or percentage of the common boundary to the total boundary greater than some threshold for both the total boundaries of A and B. If it is determined at step 162 that such a condition is true, control proceeds to step 166 where it is determined that sectors A and B are probable neighbors due to the large percentage of common boundaries shared between the two sectors indicated by the pair A and B. If it is determined at step 162 that the portion of common boundary between A and B is less than or equal to the boundary threshold for both the total boundaries of A and B, control proceeds to step 164 where it is determined that sectors A and B are not probable neighbors.

Included below is a pseudo code representation of an implementation of the probable neighbors technique generally described in the flowcharts of FIGS. 11 through 13. Prior to setting forth this pseudo code description, certain assumptions and data representations will now be described. The array best_server[place] is a representation of a best server for any pixel. Generally, the array best_server contains an identifier for the sector determined to be the best server associated with particular places indicated by the index into the array. It is assumed that a function not_a_best_server (place) returns a value of true when the corresponding pixel is not a best server as indicated by the parameter place. Similarly, it is assumed in the pseudo code description that a function over_water (place) returns a value of true when the corresponding pixel is over water. Such pixels are ignored in the probable neighbors calculation. The functions find_row (place) and find_col (place) return the row and column respectively at any pixel. The function find_pixel (row, col) returns a pixel given a particular row and column. The use of pixels in this particular example are thought of as components of a raster scan representing the geographic area. This representation in a raster type of image is a convenience rather than a necessity in using the techniques of this. Pixels may be scanned from map_start to map_end. Each row has a row_start and a row_end. Each column has a col_start and a col_end. A local array pixel_flag [place] is given values of sector identifiers. These include special values of IGNORE, UNPROCESSED and PROCESSED that are distinguishable from all sector identifiers and each other. Sectors may be scanned in order from first_sector to last_sector. Probable neighbors may be returned in a matrix as indicted in the pseudo code as neighbor_matrix with a 2 dimensional index [sector A, sector B]. The neighbor_matrix contains an entry of 1 if the corresponding pair are probable neighbors and an entry of 0 otherwise. A temporary stack is assumed to be available for pixels using the foregoing techniques to find and mark fragments including checking for and protecting against stack overflows.

Included below is the PROBABLE_NEIGHBORS pseudo code.

```
PROBABLE NEIGHBORS( )
/*
* Set small gap threshold
*/
boundary_width = 200m      /* default value for gap threshold */
width = max( (floor(boundary_width/unit_x) + 1/2) , 1)/* convert to pixels */
/*
* Set "common boundary threshold
*/
boundary_fraction = .05     /* define default threshold for "common boundary" */
/*
* Initialize
*/
for place = map_start to map_end /* scan by pixels */
        if not_a_best_server (place) or over_water (place)
                pixel_flag[place] = IGNORE
        else
pixel_flag[place] = UNPROCESSED
/*
* Find Largest contiguous region for each server
*/
for place = map_start to map_end
        if pixel_flag[place] = UNPROCESSED
                best = best_server[place]
                biggest_size = 0
                for new_place = place to map_end
                        if(pixel_flag[new_place] = UNPROCESSED and
```

-continued

```
                          best_server[new_place] = best)
/*
* Find all pixels contiguous with current one
*/
                          size_fragment = find_fragment(new_place,best,width,pixel_flag)
                          if biggest_size < size_fragment
                              biggest_size = size_fragment
                              biggest_place = new_place
/*
* Mark smaller fragments as seen/processed in largest contiguous region
*/
for new_place = place to map_end
      if pixel_flag[new_place] = PROCESSED
            if new_place = biggest_place
                  flag = best /* mark biggest fragment by best server */
            else
                  flag = IGNORE /*ignore other fragments */
            mark_fragment (new_place,best,width,pixel_flag,flag)
/*
/* finding size of border
*/
for sector_a = first_sector to last_sector
/*
* Initialize
*/
      for sector_b = first_sector to last_sector
            n_pixels[sector_a, sector_b] = 0
            neighbor_matrix[sector_a, sector_b] = 0
for place = map_start to map_end
      if pixel_flag[place] NOT_EQUAL IGNORE
            sector_a = pixel_flag[place]
/*
* conversion between pixels and rows and columns
*/
            row = find_row(place)
            col = find_colplace)
/*
* look to the east for counting pixels in the border
*/
            for other_col = col+1 to min (col+width_1, col_end)
                  other_place = find_pixel(row,other_col)
                  if pixel_flag[other_place] NOT_EQUAL IGNORE
                        sector_b = pixel_flag[other_place]
/*
* boundary is found
*/
                  if sector_a NOT_EQUAL sector_b
                        n_pixels[sector_a, sector_b]++
/*
* look to the north for counting pixels in the border
*/
            for other_row = row+1 to min(row+width+1, row_end)
                  other_place = find_pixel(other_row,col)
                  if pixel_flag[other_place] NOT_EQUAL IGNORE
                        sector_b = pixel_flag[other_place]
/*
* boundary is found
*/                if sector_a NOT_EQUAL sector_b
                        n_pixels[sector_a, sector_b] ++
/*
*Symmetrize counts and sums over border -- if a-b is border, so is b-a
*/
                          for sector_a = first_sector to last_sector
      for sector_b = first_sector to last_sector
            if sector_a < sector_b
                  n_pixels[sector_a, sector_b] = n_pixels[sector_a, sector_b] +
                                                 n_pixels[sector_b, sector_a
                  n_pixels[sector_b, sector_a] = n_pixels[sector_a, sector_b]
            if sector_a NOT_EQUAL sector_b
                  n_pixels[sector_a, sector_a] = n_pixels[sector_a, sector_a] +
                                                 n_pixels[sector_a, sector_b]
/*
* not neighbors of the border doesn't meet threshold requirements
*/
for sector_a = first_sector to last_sector
      for sector_b = sector_a+1 to last_sector
/*
* this implementation is conservative -- total boundary threshold is the smallest total boundary
* length of base station/sector pair
```

```
*/
        boundary_length_threshold = max(boundary_fraction *
                                         min(n_pixels[sector_a, sector_a],
                                             n_pixels[sector_b, sector_b])
if n_pixels[sector_a, sector_b] >= boundary_length_threshold
        neighbor_matrix[sector_a, sector_b] = 1 /* A and B are neighbors == 1
        neighbor_matrix[sector_b, sector_a] = 1 /* they are neighbors == 1
/**********************************************************************/
```

The foregoing pseudo code generally identifies a connected set of pixels for each best server. Sectors with neighboring sets of pixels are determined to be probable neighbors. In this embodiment, best server areas are notably fragmented at the pixel level. In particular, as previously discussed in conjunction with a best server map, a phenomenon that may be termed speckling may occur in which isolated pixels far from a sector have an indication of the same best server. This is in fact an artifact, for example, of small fluctuations in path loss estimation, and such isolated pixels may be excluded from probable neighbors calculation. In one embodiment, best server areas may be composed of a number of disconnected fragments each of which appears to the eye as a connected whole. For computation of contiguous regions, this may be formalized or taken into consideration. A fragment may be defined as a maximal set of piecewise connected pixels with the same best server. The pixel is in a fragment if and only if it is within the boundary width of at least one other pixel in the fragment. These fragments may be found by the find fragment function which will be described in more detail below. The point of the boundary in the probable neighbors in the probable neighbors pseudo code is to unify fragments which may be separated by insignificant gaps. As indicated in the pseudo code, the current default value for such a gap is 200 meters. Other values may also be used.

In order to consider in an embodiment the fact of widely scattered fragments which may introduce spurious probable neighbors, only the largest fragment for each best server is considered in the foregoing pseudo code. This is done by means of the MARK_FRAGMENT function which will also be described below.

Once a single fragment is identified for each best server, the number of neighboring pixels with all other best server fragments is counted. A neighboring pixel is one within the boundary along the east-west or north-south line. The point of the boundary in this particular example is to remove the effect of insignificant gaps. Best server regions with enough neighboring pixels are deemed probable neighbors. This count must be at least as large as a specified fraction of the largest possible count in accordance with the predefined threshold. In the foregoing description the default value or threshold is indicated at 5%.

Indicated below is the pseudo code for the FIND_FRAGMENT routine which is used by the probable neighbors pseudo code.

```
FIND_FRAGMENT(place, best, width, pixel_flag)
row_start = find_row(place)
/* push starting place onto the stack
push(place)
size = 1
while stack <> NULL
       new_place = pop( )
       row = find_row(new_place)
       col = find_col(new_place)
       /* look within width of new_place for connected pixels, but not before
       starting row
              for other_row = max(row–width, row_start) to
              min(row+width, row_end)
                      for other_col = max(col–width, min_col) to
                      min (col+width, col_end)
                              other_place = find_pixel(other_row, other_col)
                              if pixel_flag[other_place] = UNPROCESSED
                                     if best_server[other_place] = best
                                            pixel_flag[other_place] =
                                            PROCESSED
                                            push(other_place)
                                            size++
return(size)
/**********************************************************************/
```

The method or technique for finding fragments in best server areas is used in the probable neighbors pseudo code description and may be referred to as a flooding technique. For any pixel in a fragment, all adjoining pixels with the same best server are also made part of the same fragment. In this particular example, adjoining is defined as above within the boundary width. As each such pixel is found it is marked as being processed and pushed onto the stack. When a pixel is popped from the stack, adjoining unprocessed pixels are sought for it. The process stops when the stack is empty, indicating no more unprocessed neighboring pixels can be found. Additionally, FIND_FRAGMENT counts the number of pixels within the fragment so that the largest fragment may be subsequently identified as indicated in the probable neighbor pseudo code.

Included below is a pseudo code representation of the MARK_FRAGMENT routine which may be used in conjunction with the PROBABLE_NEIGHBORS and FIND_FRAGMENT pseudo code.

```
MARK_FRAGMENT(place,best,width,pixel_flag, flag)
row_start = find_row(place)
/* push starting place onto stack
push (place)
while stack <> NULL
       new_place = pop( )
       row = find_row(new_place)
       col = find_col(new_place)
       /* look within the width of new_place for connected
       pixels but not before starting row
              for other_row = max(row–width,row_start) to
              min(row+width, row-end)
                      for other_col = max(col–width, min_col) to
                      min(col+width, col_end)
                              other_place = find_pixel(other_row, other_col)
                              if pixel_flag[other_place] = PROCESSED
                                     if best_server[other_place] = best
                                            pixel_flag[other_place] = flag
                                            push(other_place)
```

It should be noted that a flooding technique as previously mentioned with FIND_FRAGMENT is also used to mark fragments in the MARK_FRAGMENT pseudo code pixel by pixel after the largest fragment is identified. That fragment is marked by the sector identifier for the best server. All other fragments are subsequently ignored. In the foregoing description of PROBABLE_NEIGHBORS, it should be noted that a threshold is established as a common boundary percentage. Additionally, a gap threshold is determined as indicated by the parameter with, both of these threshold conditions may be modified in accordance with each particular implementation or embodiment. Additionally, the foregoing implementation only considers the largest contiguous region for each server when determining neighboring sectors. It should also be noted that the foregoing pseudo code implementation of the general flow chart described in conjunction with FIGS. 11 through 13 takes a conservative approach when defining or determining whether two sectors are neighbors. This may be indicated by the threshold boundary_length_threshold where the threshold considers the smallest total boundary length for the base station or sectors in the pair. In the foregoing pseudo code description, this may be determined by taking the minimum of n pixels when computing boundary_length_threshold.

What will now be described are calculations involving the C/I statistics that may be computed, for example, by the pairwise C/I module 42 of FIG. 7. These calculations may be used, for example, in modifying the channel separation matrix as described in conjunction with FIG. 7.

The technique that will be described may be used in assessing the quality of channel assignments. Pairwise C/I values may be especially useful as a "figure of merit" for evaluating various frequency assignment scenarios, as may be performed in configuring the network 170. This figure of merit may be used to assess channel quality, and optimize the assignment for total interference requirements in accordance with quality service requirements, for example, as may be input to the channel separation matrix module 48.

As previously described, the pairwise C/I may be measured as the ratio of carrier power to interference power between two sectors using the same channel, or in other words, having the same channel assignment. Two pairwise C/I values exist for every pair of sectors A and B, where A is the carrier and B is the interferer, as well as where B is the carrier and A is the interferer. As will be described in paragraphs that follow, a data structure, such as a matrix, may be used to store C/I values and other associated data during the channel assignment process.

It should be noted that the interference as expressed in the C/I values may depend on such factors, for example, as coverage areas from the traffic distribution, and received power distribution. As will be described, it is assumed that measurements of power may be accurately modeled as having a log-normal distribution when the short distance fluctuations are averaged out. The power, as may expressed in decibels, is normally distributed with some predicted mean and standard deviation that are verified by measurements. Consequently, the C/I in decibels is the difference between two normal random variables with given means and standard deviations. Hence, the distribution of the C/I is normal. The mean is the difference between the mean carrier power and the mean interfering power. The standard deviation may be found by knowing the correlation co-efficient between the carrier power and the interfering power.

The statistical correlation that exists between the carrier power and the interfering power depends on the relative angle of arrival to the geographic areas being considered. Measurements may indicate that the correlation co-efficient, as will also be described, may be empirically estimated as a function of the magnitude of the angle between the paths to the point of interest in a coverage area. In this instance, the correlation co-efficient is a maximum of 0.9 at an angle of 0, and drops off linearly to 0 at a 180 degrees.

Once a C/I distribution is found at each point, the distribution is weighted proportionally to the estimated traffic for the area in the neighborhood of the point, and averaged over all the points covered by the carrier sectors coverage area. An overall distribution of C/I is thus formed. The pairwise C/I estimate may be defined as a percentile from this distribution, for example, the 10th percentile may be used.

Figure 14:
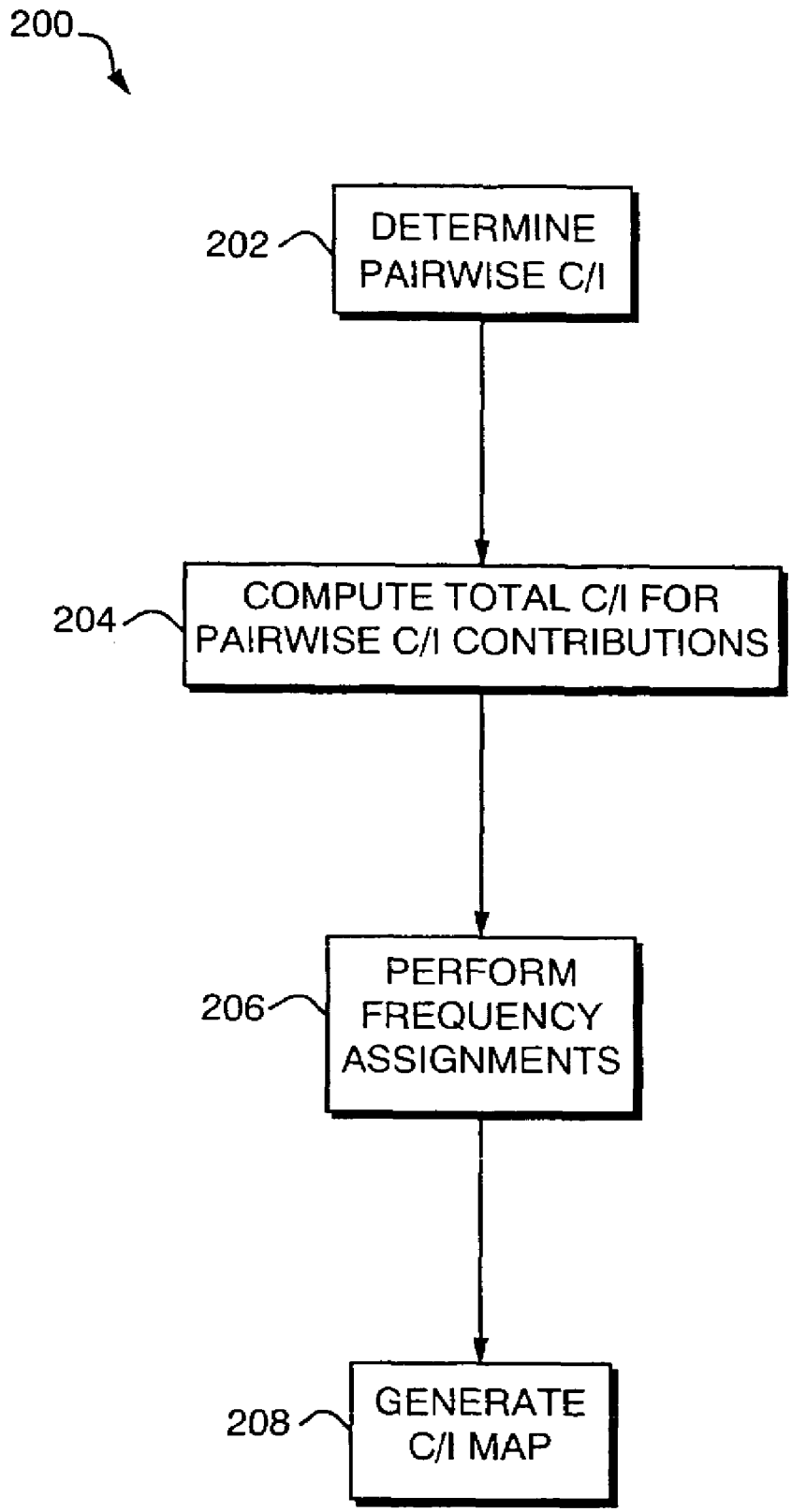
FIG. 14 is a flowchart of an example of an embodiment of steps of a method used in performing C/I calculations in frequency assignments.

Referring now to FIG. 14, shown is a flowchart of the method steps as may be used in computing and using C/I calculations in performing channel assignments. At step 202, pairwise C/I is determined for each pair of sectors. At step 204, the total C/I is computed for each of the pairwise C/I contributions. The total C/I may be expressed as a summation over pairwise C/I contributions. In this particular embodiment, two types of total C/I computations may be considered when performing step 204. These two types may be termed co-channel C/I and adjacent channel C/I calculations. Generally, the total C/I may be computed for each channel i assigned in a sector j producing some carrier power to some interference power. This may be termed co-channel C/I. This may be expressed in the following formula:

$$(C/I)_{j,i} = \frac{1}{\sum \frac{1}{(C/I)_{k,j \, pairwise}}}$$

where the sum $\Sigma$ in the above formula is for all k such that channel i is assigned to sector k.

It should be noted that C/I $_{j,i}$, the left hand side of the foregoing equation, is the total interference at sector j on channel I. Additionally, C/I $_{k,j}$ pairwise is the pairwise interference at sector j due to sector k.

Similarly, the adjacent channel C/I may be computed as:

$$(C/I)_{j,i} = \frac{1}{\sum \frac{1}{(C/I)_{k,j \, pairwise}}}$$

where the sum $\Sigma$ in the above formula is for all k such that channel i−1 or channel i+1 is assigned to sector k. Generally, as will be described in paragraphs that follow, these two types of total C/I calculations involving co-channel and adjacent channel C/I may be used as C/I constraints that may be considered when performing frequency selection, for example, using channel assignments techniques.

At step 206, frequency or channel assignments are performed in accordance with C/I calculations as performed in step 204. In particular, as will be described in conjunction with other Figures, the C/I calculations may serve as constraints in a particular embodiment of the system and may affect whether a particular channel or frequency is assigned to a particular sector or sectors. At step 208, a C/I map may be generated. Generally, the C/I map is produced as an analysis tool for assessing the quality of channel assignments. A C/I map calculation is a representation where, for each pixel representing a certain geographic area, the "worst" assignment made for a particular channel is examined. For example, in one embodiment the "worst" channel assignment may be determined in accordance with the weakest signal strength. This may assist in presenting a graphical representation of how well channels were assigned to particular sectors in accordance with certain criteria, such as strength for resulting signals, for particular channel assignments.

Figure 15:
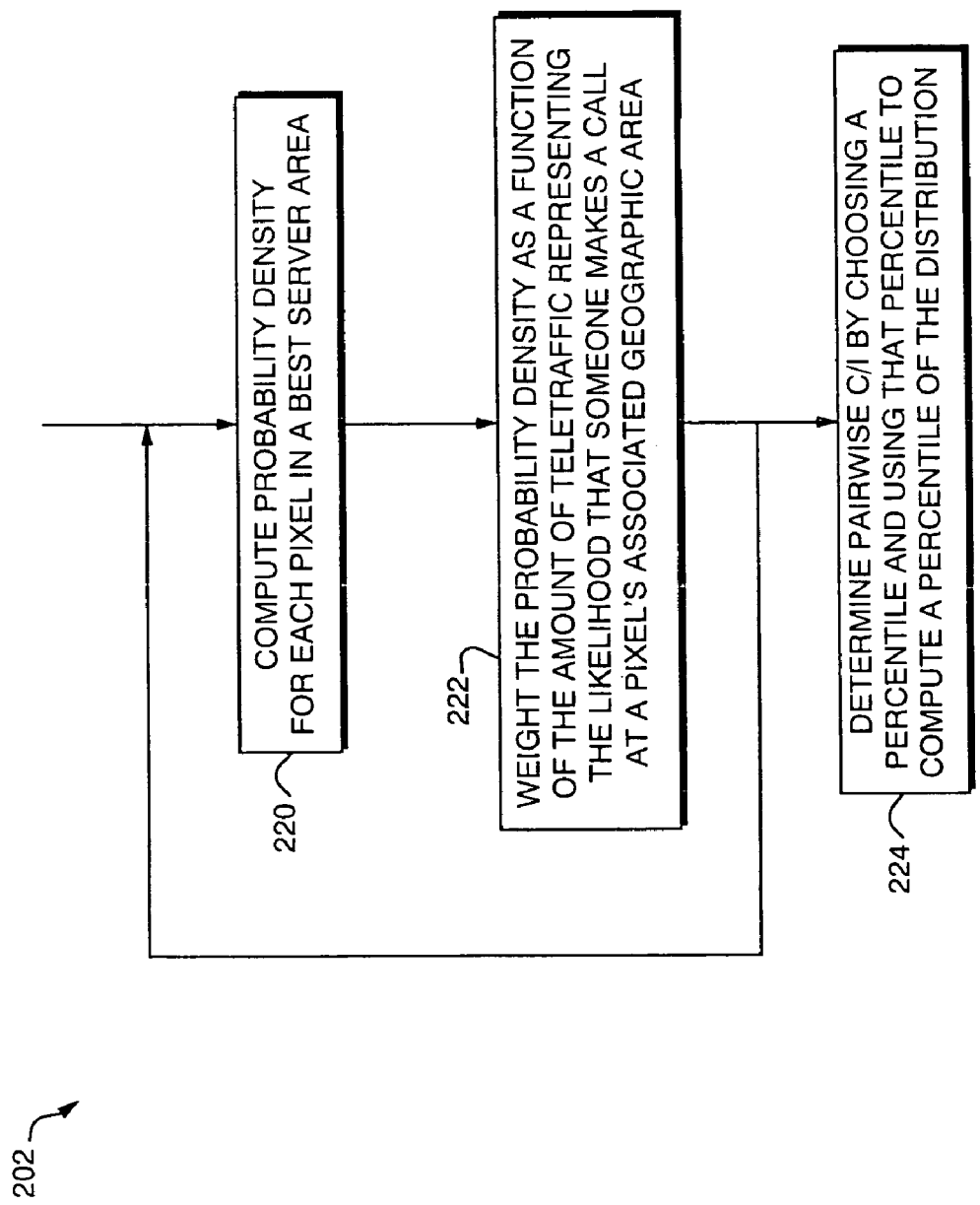
FIG. 15 is an example of a flowchart of more detailed sets for determining pairwise C/I calculations.

Referring now to FIG. 15, shown is an example of an embodiment of a flowchart that includes method steps for determining pairwise C/I. Generally, FIG. 15 is a more detailed description of step 202 from FIG. 14. At step 220, the probability density is computed for each pixel in the best server area. At step 222, the probability density is weighted as the function of the amount of teletraffic representing the likelihood that someone would make a call at a pixel's associated geographic area. Subsequent to performing the loop of steps 220 and 22 for each pixel, control proceeds to step 224. In other words, step 224 is performed collectively after steps 220 and 222 have been performed for all pixels. At step 224, pairwise C/I's are determined by choosing a percentile and computing a percentile of the distribution previously produced in step 222.

What will now be described is determining the pairwise C/I calculations as may be used in computing the total C/I for co-channel and adjacent channel constraints in determining whether to perform channel assignments.

Figure 16:
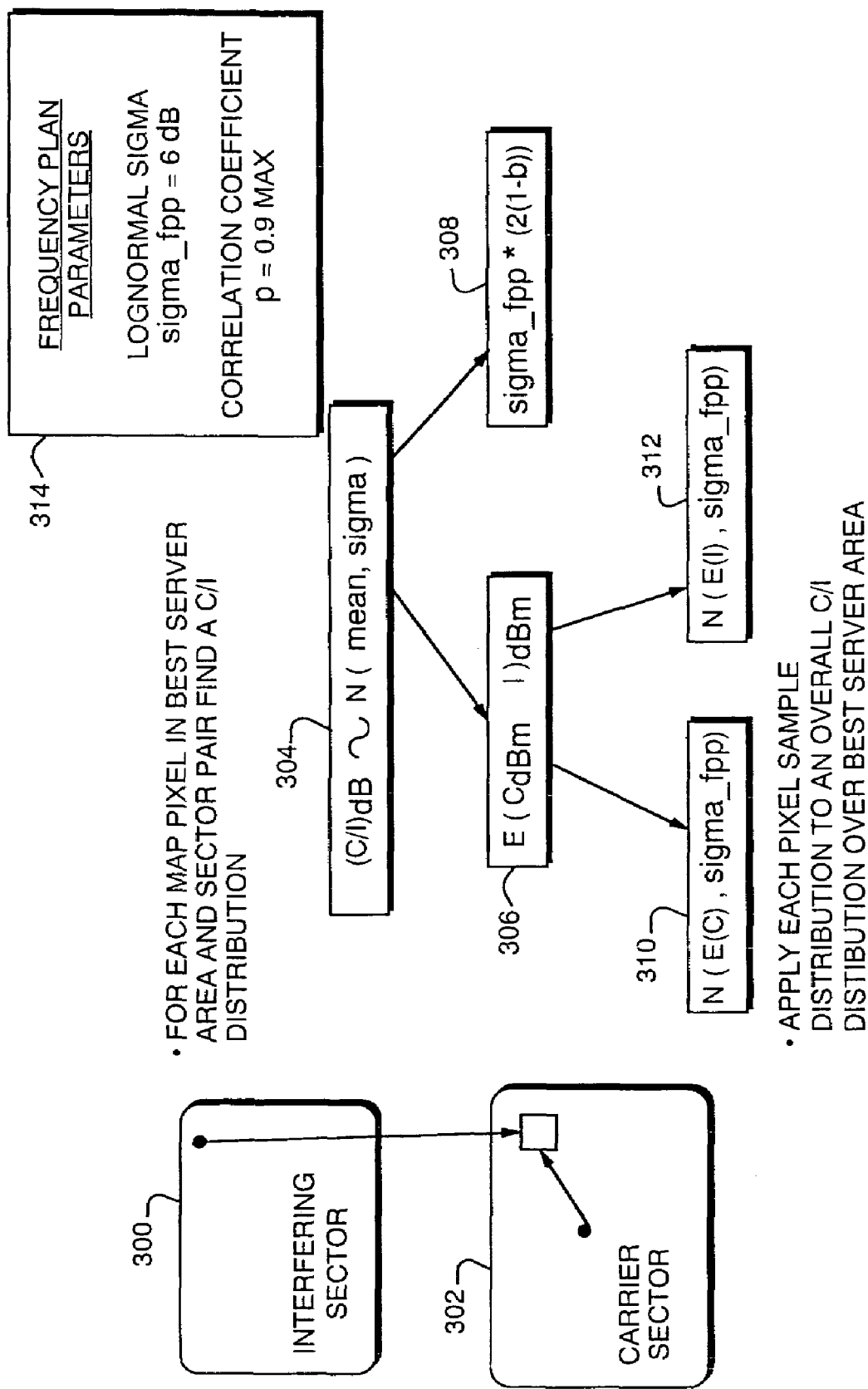
FIG. 16 is an example of an embodiment of the various formulas as may be used in performing C/I calculations.

Referring now to FIG. 16, shown is a graphical representation of the pairwise C/I calculation for an interfering sector 300 and a carrier sector 302. For each map pixel in the best server area indicated, for example, by a best server map and a sector pair, a C/I distribution is calculated. Formula 304 represents the relationship for C/I calculations being distributed with a particular mean and standard deviation. As previously described in this particular example for frequency planning as represented by box 314 of FIG. 16, frequency plan parameters are chosen such that this is a log normal distribution having a log normal sigma or standard deviation, and a correlation co-efficient of p=0.9. This may be used, for example, in the formula expressed by box 308 where sigma_fpp represents the standard deviation of C/I. It should be noted that there is an assumption of a linear drop-off to use this particular correlation co-efficient. Formula 306 relates the mean of formula 304. The mean is assumed to be normally distributed and thus the expected value or mean may be represented as in formula 306 and relates to formulas 310 and 312 also shown in FIG. 16 where $N(\mu,\sigma)$ represents a normal probability distribution.

Figure 17:
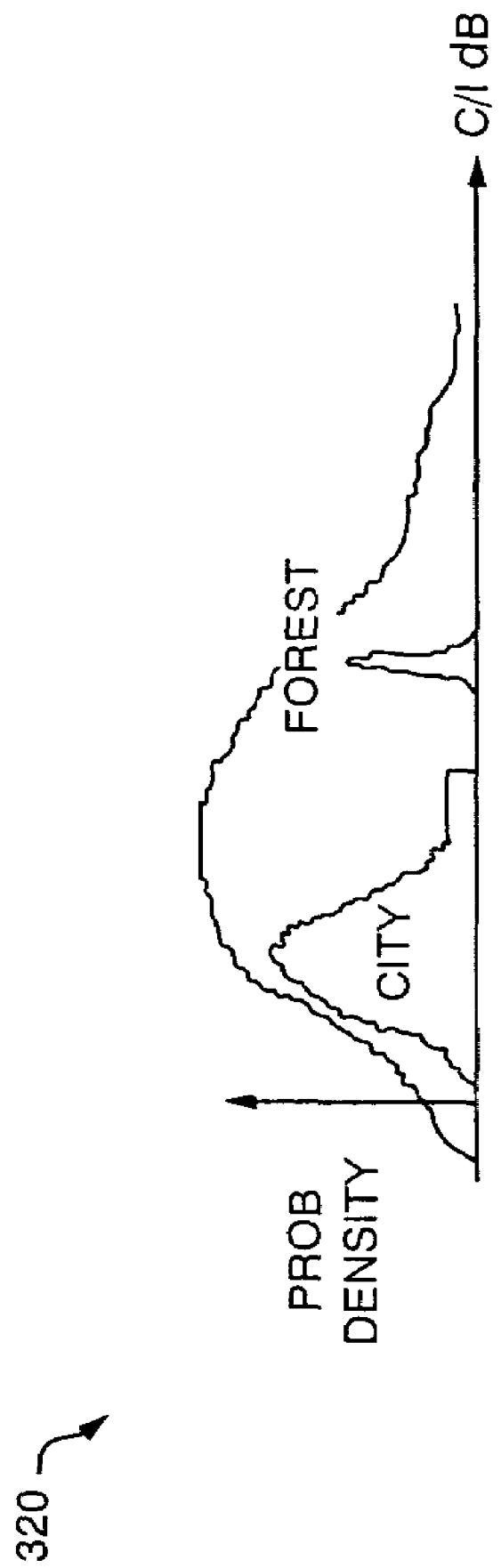
FIG. 17 is an example of an embodiment of a graphical representation of a probability density function.

Referring now to FIG. 17, shown is a graphical representation of an embodiment of the effect of traffic and angular correlation dependence in the overall C/I distribution. The graphical representation 320 illustrates traffic and angular correlation effects on C/I probability density. An interfering sector creates interference power I into a serving carrier sector with random carrier power C. The probability density for this pairwise sector interaction is accumulated as shown in FIG. 17 by weighting each locations' sample C/I probability density with the traffic at that location. The sample location for a city is shown to have a large traffic weighting relative to a sample location for a forest. Because there is a small difference in angle of arrivals for the forest example, there is a relatively high correlation between the carrier power and the interference power due to similarities in the propagation path traversed. This results in relatively less variability in the C/I sample for the forest as shown by the relatively tight distribution in the graphical representation 320.

As previously described in conjunction with FIG. 16, frequency plan parameters may be chosen, such as a sigma_fpp or standard deviation of 6 decibels, and a maximum coefficient of 0.9 with a standard percentile of 10 being chosen. In one embodiment, the weighting, as may be performed for the distribution of each location sample C/I, may be performed in accordance with a traffic map or Land Use Land Cover (LULC) map. As previously described, the probability distribution for C/I in each pixel in the best server area may be determined assuming a lognormal distribution which corresponds to cell fading and a particular interferer. Distribution has been averaged over all pixels in the best server area. The percentile for distribution may be computed characterizing the pairwise C/I for the best server area in the particular interferer. The average distribution may be formed using the cumulative probability distribution.

A measure of goodness of the assignment in terms of co-channel C/I is found by assuming all channels are in use and that the interference from each sector using the same channel is that given by a pairwise C/I estimate, as previously discussed in conjunction with the co-channel and adjacent channel C/I calculations.

Included below is a pseudo code description of the pairwise C/I calculations as may be included in an embodiment.

```
form_pairwise_CtoI (pairwise_CtoI, percent_worse)
    for interferer = first_subsector to last_subsector
        for best = first_subsector to last_subsector
            /** initialize cumul_dist */
                for grid_point - first_grid_point to last_grid_point
                    cumul_dist[best, grid_point] = 0
            read_path_list(interferer) /** get pixel maps, best server **/
            for pixel = first_pixel[interferer] to last_pixel[interferer]
                best = best_server(pixel)
                if best <> NO_BEST_SERVER
                    weight = traffic(pixel)
/** compute mean E by computing difference between C and I values for normal distribution **/
                    mean = server_power_dB(pixel) -
                            interferer_power_dB(interferer, pixel)
                    cor = correlation(best, interferer, pixel)
/* sigma is standard deviation **/
                    sigma = DEFAULT_SIGMA * SQRT(2(1-cor))
                    grid_value = GRID_START
                    for grid_point = first_grid_point to last_grid_point.
/** compute probability density **/
                        cumul_dist[best, grid_point] = cumul_dist[best, grid_point]
                            + weight * cumulative(grid_value, mean, sigma)
```

```
                    grid_value = grid_value + GRID_SPACING
        for best = first_subsector to last_subsector
                threshold = percent_worse * total_traffic(best)
                grid_point = first_grid_point
                grid_value = GRID_START
/** threshold is the percentile **/
                while(cumul_dist[best,grid_point] < threshold and grid_point <= last_grid_point)
                    grid_point ++;
                    grid_value = grid_value + GRID_SPACING
            pairwise_CtoI[interferer, best] = grid_value
```

With regard to the foregoing pseudo code, a number of assumptions have been made about the available ancillary functions. In particular, the function read_path_loss(sub_sector) makes available the path loss for all the pixels that are sufficiently close to a given subsector together with associated ranges of pixels. The function interfere_power_dB(sub_sector, pixel) uses the path loss previously made available by read_path_loss to compute the received power from a given subsector at the given pixel. The function server_power_DB(pixel) also computes the received power at the given pixel. Here, the transmitting subsector is the best server for that pixel. The corresponding path loss is not made available by a call to read_path_loss. The function traffic (pixel) gives the traffic for a given pixel which is assumed to be allocated to the best server subsector for the pixel. Recall that traffic relates to a weighted use of population information. The function total_traffic (sub_sector) gets the total traffic supported by the given subsector. It is assumed that this is equal to the total of the traffic for all the pixels for which the given subsector is the best server.

It should also be noted that the forgoing pseudo-code forms an unnormalized cumulative distribution function. The percentile threshold is normalized rather than the distribution function simply because in this particular embodiment it requires less computation. However, other embodiments may vary from this by using techniques known to those skilled in the art for each particular implementation. The normalization factor given by the foregoing function total_traffic (best) is not equal to the sum of traffic given by the function traffic (pixel) this is because the pixels within the range of a given interfere need not include all the pixels for a given best server area. It should also be noted that omitted pixels are not explicitly treated in the above pseudo-code. The omitted pixels for example correspond to pixels for which the means C/I should be very large. If they were included in the above pseudo code the shape of the cumulative distribution function may be affected only at the high end. This omission thus effects the percentile only when the C/I is large so that it does little more than indicate that there is effectively no interference from a corresponding subsector.

A note should also be made regarding the correlation. When the propagation path from the desired signal and the interferer are nearly identical, the lognormal fading of the two are highly correlated. Consequently, the standard deviation of the resulting C/I distribution is reduced. The technique for finding the angle between two propagation paths may use the angle to compute the correlation coefficient. In one embodiment, the angle between the two directions of arrival is computed using vector projection. Another embodiment may use the law of cosines which may be more computationally intensive than using vector projection. Subsequently, correlation is now a linear function of the angle when using vector projection, interpolating between a "peak value" at 0 degrees, and zero at 180 degrees. In one embodiment, such as in the GRANET embodiment, the configuration tool may be "hardwired" to use a for peak value of 0.9 for correlation coefficient. Recall, that a correlation coefficient with a peak of 0.9 for a maximum was previously described in conjunction with box 314 of FIG. 16 for the particular implementation of the described herein.

It should be noted that a pairwise C/I calculation previously described uses the ratio of carrier strength to the strength of an interfering signal for a second sector assuming the second sector is transmitting on the same frequency as the first sector. Techniques have been described which take as input traffic map or LULC information, as well as best server area path loss information, site, sector, and as well as antenna information. The foregoing techniques produce a C/I matrix representing the pairwise C/I calculations for a particular pair of sectors. Also as previously described in the foregoing, the pairwise C/I calculations as may be store for example in the C/I matrix are used in producing total or power sum C/I calculations. The total C/I may be computed for a co-channel assignment and/or adjacent channel assignment representing the ratio of the carrier power from the server on a channel to the power of all interfering signals on that channel or on adjacent channels. Total C/I may be computed for the following sets of channel assignments including, but not limited to, voice channels, signaling channels, voice channels with the same SAT, and signaling channels with the same DCC. Inputs used computing the total C/I calculations in frequency planning are the assigned frequencies per sector in the pairwise C/I calculation.

A C/I map may be generated from completed frequency plans. Generally, as previously described the C/I map represents, given a pixel in a particular best server area, the propagation functionality being used to estimate the received power from the best server and from all possible interferers. The sector with the strongest of these interferers is identified together with corresponding C/I ratio. Recall, that the C/I ratio is the difference in decibels between desired signal power and interference power.

Two different forms of C/I maps may be formed. For co-channel C/I, the interference comes from any sector that is assigned or any channel assigned to the best server. For adjacent channel C/I interference comes from any sector that is assigned any channel adjacent to a channel used to the best server. For the C/I map computations, the inputs include frequency planning or assignments as well as path loss information. Using the foregoing C/I techniques, a C/I map may be output for the strongest interferer in the particular interfere.

It should be noted that the total C/I is meaningful in the context of a particular frequency plan and may be computed for example by summing the previously computed pairwise C/I values directly. Summation may be formed as though there are constant C/I values by summing them.

What will now be described is a technique which assigns cellular channels within a cellular network utilizing penalty functions. As will be seen as a benefit from this technique, it may be used to provide a "figure of merit" of estimates of the network regarding the cellular channel assignment. In other words, most other techniques provide a yes or no type of answer regarding whether a set of channel assignments may be used within the cellular network. It is often the case that the network planner desires information about answers that are close to the requested threshold (e.g., requested channel assignments in accordance with other criteria) even though the channel assignments may fail to be within a particularly specified limit or threshold. This information regarding the proximity or closeness to the request threshold is generally not obtainable with current techniques unless they are rerun from scratch with new parameters that may require significant amounts of computational resources. The present technique which will be described enables a network designer to, for example, perturb the network around the boundaries so that information may be obtained in the range of the desired threshold. Additionally, the technique which will be described allows for the addition and removal of network elements, such as sectors or base stations or available channels, and also provides for a scenario to be rerun without having to begin the channel assignment from scratch. This is generally a benefit and enhances model efficiency and reduces computing costs.

The following paragraphs describe a technique for evaluating channel assignment by using a penalty function. This technique has the goal of minimizing the number of channels assigned as well as obeying the constraints set forth, for example, in the constraint matrix.

What will now be described is how the penalty function which is used in following techniques to be described is derived. A cellular system is first considered having N sectors. The following definitions or symbols are used in the equations that follow:

N=the number of sectors in the network;
M=the number of channels used;
$M_t$=the total number of channels in the spectral band;
$d_i$=the number of channels required in sector i, $1 \leq i \leq N$;
$S_{ij}$=the channel separation matrix or constraint matrix;
$f_{ik}$=the kth frequency assigned to sector i where k represents the actual channel identifier,
k=1, . . . , $d_i$.

subject to the constraints as expressed in the corresponding constraint matrix elements for $$|f_{ik} - f_{jl}| \geq S_{ij}$$

for all i, j, k, and l except for the case where i=j, and k=l.

Referring now to FIG. 18, shown are formulas used in deriving the penalty function in the technique which will be described. Element 602 is a formula expressing a constraint $G_{ijkl}$, 604 as a function of the channel separation 606 and an element from the constraint matrix 608. It should be noted that the subscripts i, and j represent different sector numbers, and k and l refer to channels. In combination i and j correspond to subscripts, for example, of elements of the channel separation matrix. It should be noted that a coordinate as represented by element 606 may be assumed to be continuous. A penalty function may be defined as in equation 610. Intuitively, the penalty function may represent the cost to be associated with a configuration which strays from a more preferred configuration as close to Sij as possible.

Figure 19:
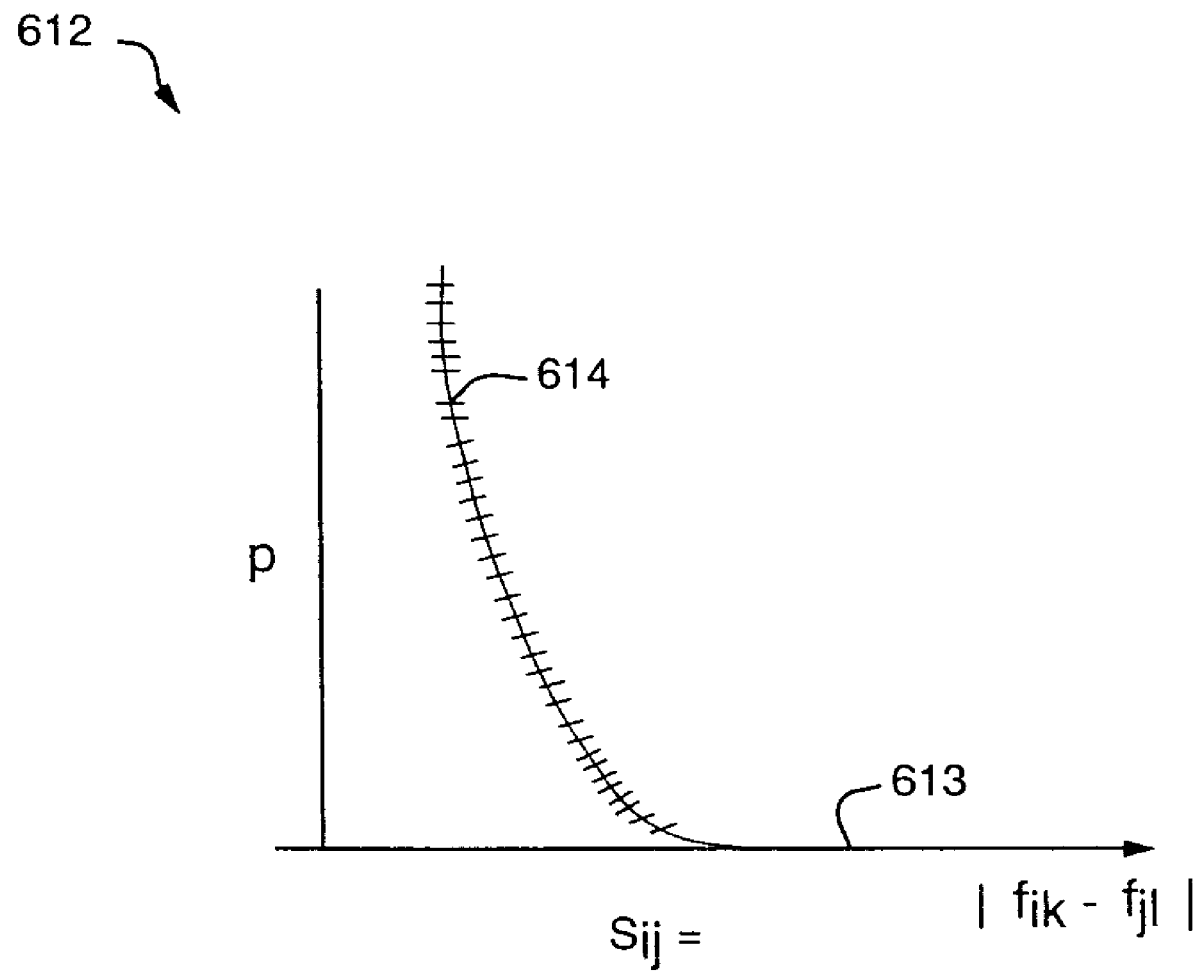
FIG. 19 is an example of a graphical representation of a penalty function.

Referring now to FIG. 19, shown is an example of an embodiment of a graphical representation of the penalty function. The graph 612 shows the penalty P on a graph versus channel separation on the x axis. The line 614 is a graphical representation of how the penalty function may approximate a value Sij. The lower portion of line 614 is indicated by 613 representing a point on the curve 614 for which there is no penalty. It should be noted that the curve goes to zero at Sij and remains at zero to the right of Sij at indicated by line 613.

Referring now to FIG. 20, shown are the various formulas that may be used to derive an improved penalty function. Equation 620 is a representation of the basic constraint. Element 622 represents the channel separation and the element $S_{ij}$ represents an element from the constraint matrix for a given pair of sectors i and j. This may be rewritten to the form of equation 624 which is algebraically equivalent to that equation on 620. Equation 624 may also be rewritten as equation 626 having the equality of equation 624 still hold while also removing the absolute value indicated by quantity 625 from equation 624. The removal of the absolute value is achieved in this particular example by raising the quantity 625 to an even power of 2, element 628, as indicated in equation 626. More generally, the mathematical representation and algebraic equivalence of equation 626 may be rewritten in the form of equation 630 which still holds true by generalizing the power 628, which is 2, to be any even power of 2 as indicated by element 632 with a superscript of 2n. It should be noted that the generalization from equation 624 to 626 of raising the absolute value to an even power always causes that value to be non-negative. The transition from equations 626 to 630 generalizes that fact by raising the entire quantity to any even power 632. Similarly, to ensure that the entire left-hand side of equation 630 is non-negative, the entire quantity 633 is raised an even power 2m as indicated in element 636, for m greater than or equal to 1. Thus, equation 634 represents the penalty function for any two sectors i and j having, respectively, channels k and l.

Figure 21:
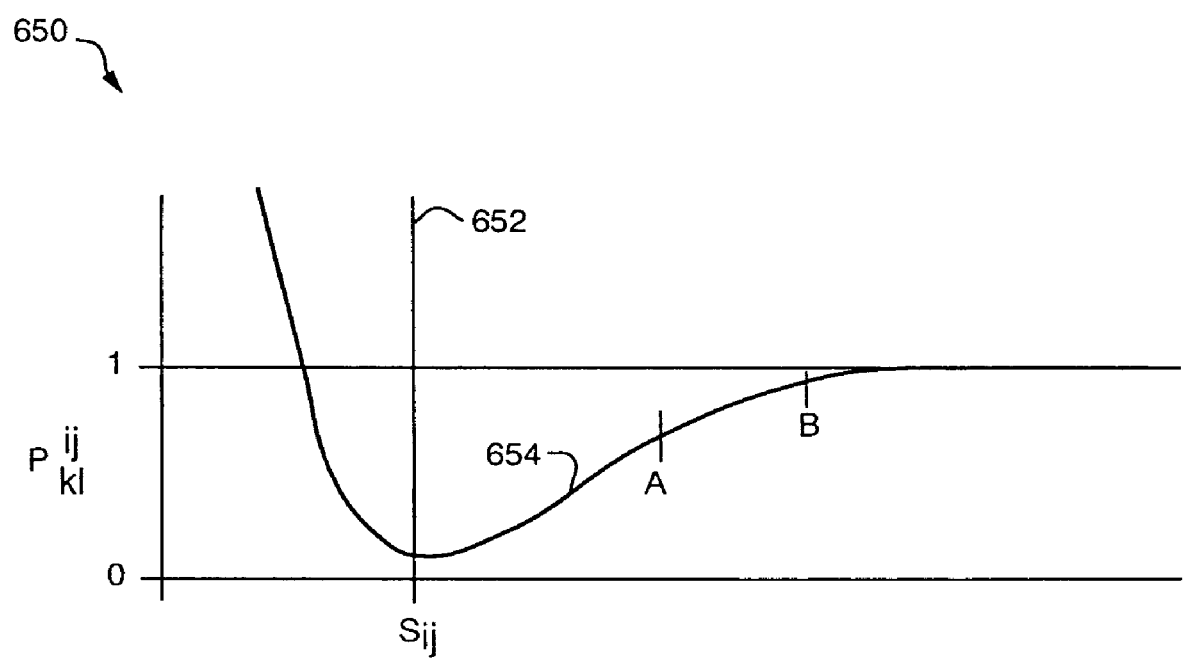
FIG. 21 is an example of an embodiment of a graphical representation of the penalty function for a pair of sectors.

Referring now to FIG. 21, shown is a graphical representation of the penalty function derived in the formulas from FIG. 20. This graphical representation 650 has the penalty function P versus a channel separation coordinate. Generally, as previously described a channel separation coordinate $f_{ik} - f_{il}$ has i and j being a pair of sectors and k and l respectively representing a channel in each of the sectors. In this particular embodiment points A and B are indicated on line 654 which is a graphical representation of the penalty function at such channel separation coordinates. It should be noted that the line graphically represented at element 652 represents a minimum value for a penalty function representing a desired condition for which to obtain a channel assignment. Generally, the penalty function may be interpreted as a potential with a gradient which determines the attractive and repulsive forces between channels k and l associated with sectors i and j. These forces are "balanced" when the separation is equal to $C_{ij}$.

Regarding the two points A and B, A represents a channel separation coordinate which is better than channel separation coordinate B in accordance with evaluation with the penalty function for a pair of sectors.

Referring now to FIG. 22, shown are two equations representing summation information in accordance with the previously described penalty function. Equation 670 generally represents the potential between two sectors i and j by summing the penalty function values over all of the channels required at those sectors. This potential represented by the quantity $V_{ij}$ is indicated by element 674 in equation 670. Similarly, the total potential for the entire system, for all channels and all sectors, may be obtained by adding the pairwise contributions as represented in equation 672.

Using the forgoing techniques as represented in the equations of FIG. 22, a summation of the penalty function may be used to evaluate a figure of merit for a giving channel assignment in a cellular network.

Now that equations regarding the penalty function in sum as well as the individual contributions from each pair of sectors have been established, appropriate values are chosen for n and m. In this particular embodiment, recall that the values for n and m are integers chosen to be used in accordance with equations 630 and 634 as previously described in conjunction with formulae 630 and 634. Recall that values of m and n are those values used with regard to the exponents in the equations previously described.

In this particular embodiment, m is arbitrary so the value of m=1 will be used in the description that follows. It should be noted that other values for m may be used in other implementations. It should also be noted that the parameter n controls the width of the potential curve as previously shown in graph 650. In other words, the parameter n controls the shape around the value of the penalty function as it approaches Sij in the graph 650.

It should be noted that the shape is adjusted so that for large channel separations, the penalty function will approach unity. Thus, when a particular penalty value such as A or B in graph 650 is evaluated, it will fall between 0 and 1, i.e, values in this range are valid. When the separation coordinate |fik−fjl| is less than Sij, the existing penalty can be much larger than unity (the left side of the curve). Using this technique, the value of n is adjusted such that when |fik−fjl|=Sij−1, i.e., when a channel constraint is violated by just one channel, the penalty function will yield a value larger than or equal to zero. Values larger than or equal to one reflect violations of the constraints.

Note that particular values for n and m may be chosen in one embodiment for the entire system. Recall that the equations described in conjunction with other figures, for example equation 634, compute the penalty function for a particular pair of sectors. Thus, for each particular pair of sectors, the values for n and m may be used globally for all pairs of sectors as represented in a particular penalty function value by equation 634. Alternatively, another embodiment may choose individual values for n and m in accordance with each pair of sectors. Thus, in a second or alternate embodiment, additional computation is used in that values for m and n are chosen for each pair of sectors.

Referring now to FIG. 23, equation 700 shows the representation of the penalty function for a particular pair of sectors. In other words, equation 700 represents a mathematical equality that holds true for any particular pair of sectors in any particular pair of channels associated with each of those sectors. Equation 700 may be used to find values of "n", as occurring in later equations derived from 700, that produce a constraint violation. From equations 700, and 634 (of FIG. 20), equations 702, 704, and 706 may be derived. The form of equation 706 may be used in determining values for "n" that lead to a desired penalty behavior. It should be noted that equation 706 includes an inequality which subsequently leads to many possible values for "n". The technique described herein is to generally examine the values of Sij in the constraint or separation matrix, determine the largest Sij and use this value in equation 706. Note that for Sij=1 leads to any value of "n" larger than or equal to zero.

It should also be noted that if a single "n" is used for the entire network, e.g., globally used in calculations as previously described, the largest Sij may be used. Alternatively, and preferably, a different "n" may be used for each pair of sectors choosing a different "n" in accordance with each Sij.

It should be noted that the value of delta x in equation 700 represents that quantity previously described as the channel separation coordinate, $f_{ik}-f_{il}$.

Equation 704 is derived from equation 702 by taking the natural logarithm of both sides of the equation 702 thus making the equality still hold true in equation 704. Equation 706 the final representation solving of the values for n giving the initial condition and guidelines to be used when choosing a value for n with regard to equations 634.

Figure 24:
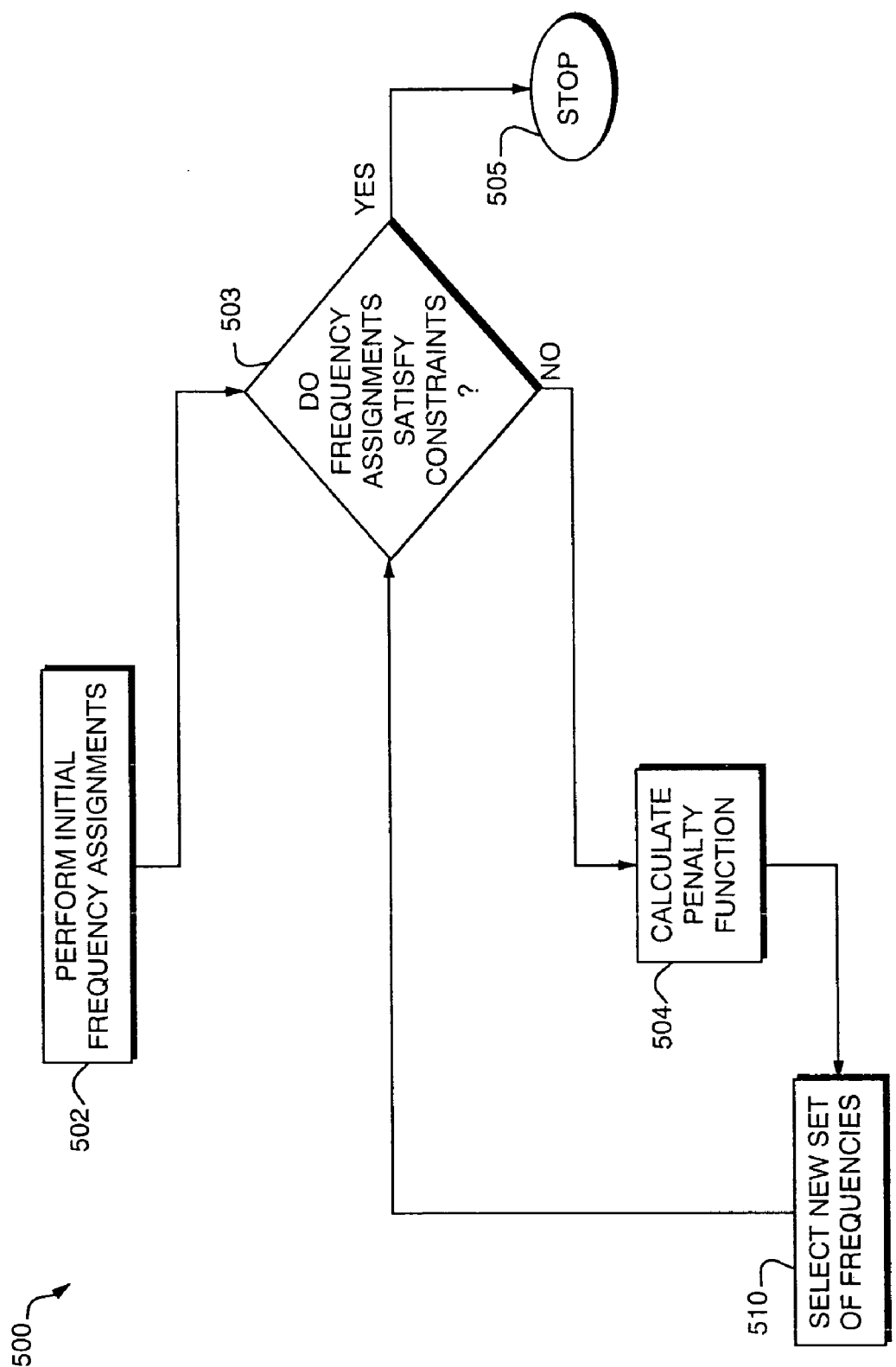
FIG. 24 is a flowchart of an example of an embodiment of a method using the penalty function in performing channel or frequency assignments.

Referring now to FIG. 24, shown is a flowchart representing an example of an embodiment of a method steps of how a penalty function may be used in evaluating frequency plans. Flowchart 500 begins with step 502 at which initial frequency assignments are performed. Generally, initial frequency assignments may be obtained, for example with regard to past or prior frequency assignment. An alternate technique may also perform initial frequency assignments on an arbitrary basis, for example, in accordance with step 510 for the selection of a new set or subsequent sets of frequencies. Control proceeds from step 502 to step 503 where a determination is made as to whether the selected frequency assignments satisfy predetermined constraints, such as those of the constraint or channel separation matrix. If the frequency assignments satisfy the predetermined constraints, control proceeds to step 505 where the method stops.

If the frequency assignments do not satisfy the predetermined constraints, control proceeds to step 504 at which the penalty function is calculated. The penalty function as in step 504 may be calculated for the entire system in accordance with equations used with FIG. 22. Control proceeds to step 510 where a set of new frequencies is selected. Control proceeds to the top of the loop formed with step 503 where a determination is made with regard to the newly selected frequencies and the predetermined constraints.

It should be noted that the constraints may include one or more items, including, for example, termination when the penalty function has a value or zero, or when a maximum number of iterations has been exceeded indicating a condition that convergence has been achieved within a specified tolerance, or no channel separation violation for each pair of sectors.

It should be noted that any one of the variety of unconstrained frequency assignment techniques may be used to modify or select a new set of frequencies in step 510. For example, genetic algorithm techniques, and the steepest descent technique may be used in producing subsequent sets of frequencies. It should be noted, for example, with regard to genetic algorithms, the penalty function may be used to determine what generation is a "good generation" used to produce subsequent generations in a genetic algorithm. Using alternate techniques such as the steepest descent technique, the penalty function may be alternatively used in accordance with each appropriate assignment technique, as may be used in step 510. There may also be a timeout or maximum number of iterations value established such that flowchart 500 stops execution in accordance with this maximum number of iterations. This maximum number of iterations or maximum time value may be used, for example, to obtain a figure of merit with regard to frequency assignments in a case where there is no frequency assignment for a particular network configuration resulting in a penalty function value less than a threshold value. Using the method of flowchart 500, a figure of merit may be obtained using the penalty function even though no particular frequency assignment configuration met the other criteria tested at step 503.

It should be also noted that the penalty function as described herein in the foregoing equations may be used to evaluate alternative frequency plans.

Figure 25:
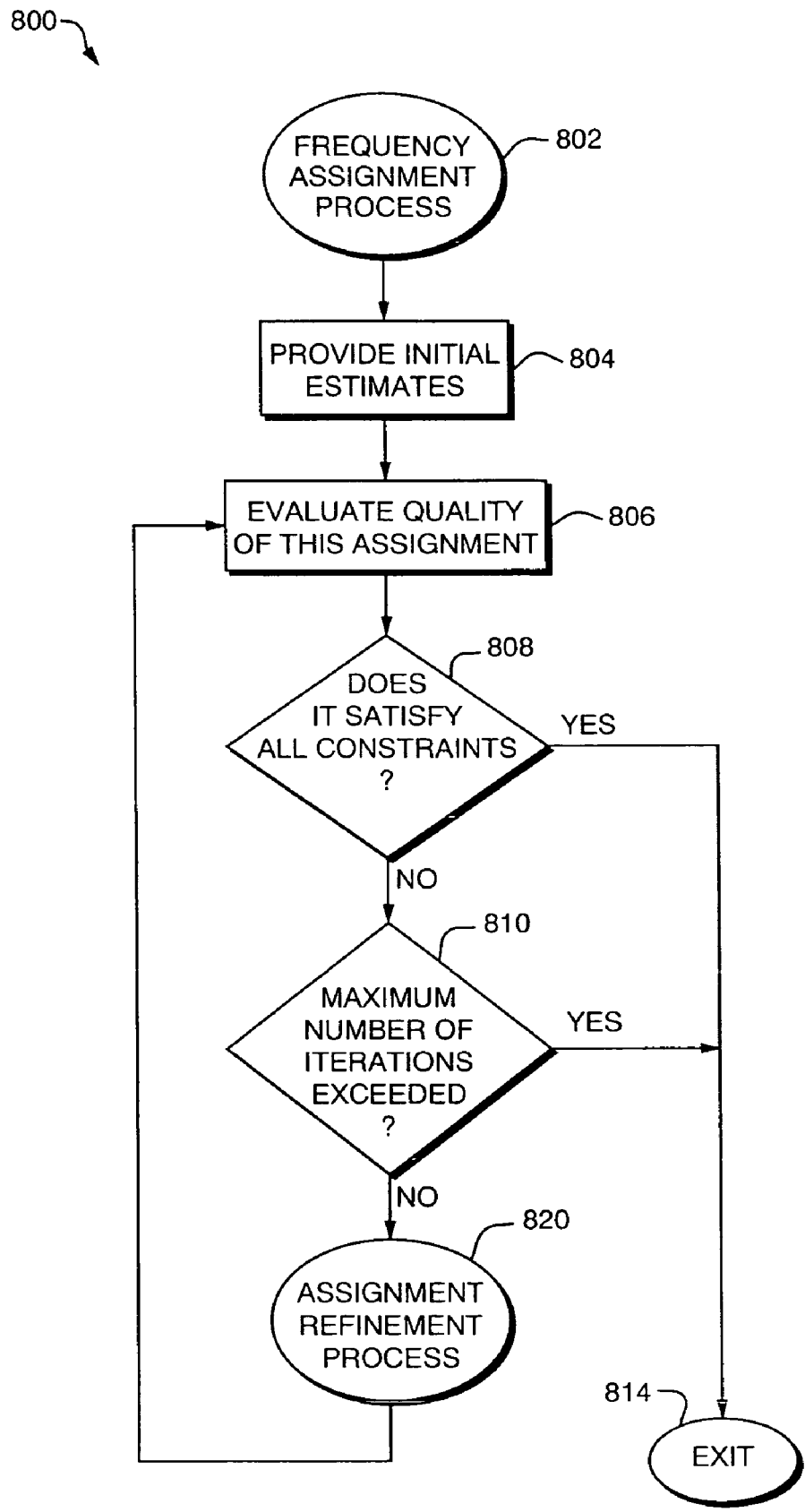
FIG. 25 is a flowchart of an example of another embodiment of a method using the penalty function in performing channel or frequency assignments.

Referring now to FIG. 25, shown is a flowchart of an example of another embodiment of a method using the penalty function in the frequency assignment process. At step 84, initial estimates are provided for initial frequency assignments. This step is similar to step 502 previously described. In one embodiment, these estimates may come from several sources in accordance with each embodiment and implementation. The initial assignment may be a random or arbitrary assignment of frequencies. In a second embodiment, the initial assignment may also be produced as a result of some other technique. In this instance, the method 800 may be used to fine tune the assignments. In yet a third embodiment, a heuristic may be used to provide a "rough" estimate in which the heuristic may be fast in producing this initial set. This may be refined using the penalty function as well. In yet a fourth embodiment, an existing frequency plan may be used alone. Additionally, a few sectors or base stations may be added to this configuration. Using method 800 with this fourth embodiment may result in a new incremental assignment by finding frequencies that minimize the penalty relative to existing frequency assignments.

At step 806, the quality of the assignment of step 804 is evaluated. One technique that may be used to characterize the quality of assignment is to evaluate the overall penalty function as in the equations such as 670 and 672. If all constraints are satisfied, the penalty function will evaluate to zero. However, this may be the case only in relatively simple networks. More typically, this value will be non-zero indicating that the inequality portion of the constraint is being satisfied. Therefore, the penalty function in this instance may be considered a relative measure of the quality allowing comparison of two channel assignments or frequency plans. What is also additionally performed is an independent check to ensure that all assignments are satisfied as expressed in equation, previously described:

$$|f_{ik} - f_{jl}| \geq S_{ij}$$

for all i, j, k, and l except for the case where i=j, and k=l.

At step 808, a determination is made as to whether all constraints are satisfied. Note that this may include evaluation of the penalty function as well as additional criteria or constraints, such as the separation matrix constraints, in accordance with each embodiment and implementation. If all constraints are satisfied, control proceeds to step 814 where the method stops. If all constraints are not satisfied, control proceeds to step 810 where a determination is made as to whether a predetermined maximum number of iterations has been exceeded. If a determination is made at step 810 that the maximum number of iterations is exceeded, control proceeds to step 814 where the method 800 stops. If a determination is made at step 810 that the maximum number is not exceeded, control proceeds to step 820 where the channel or frequency assignment is refined, for example, to produce a new channel assignment.

Figure 26:
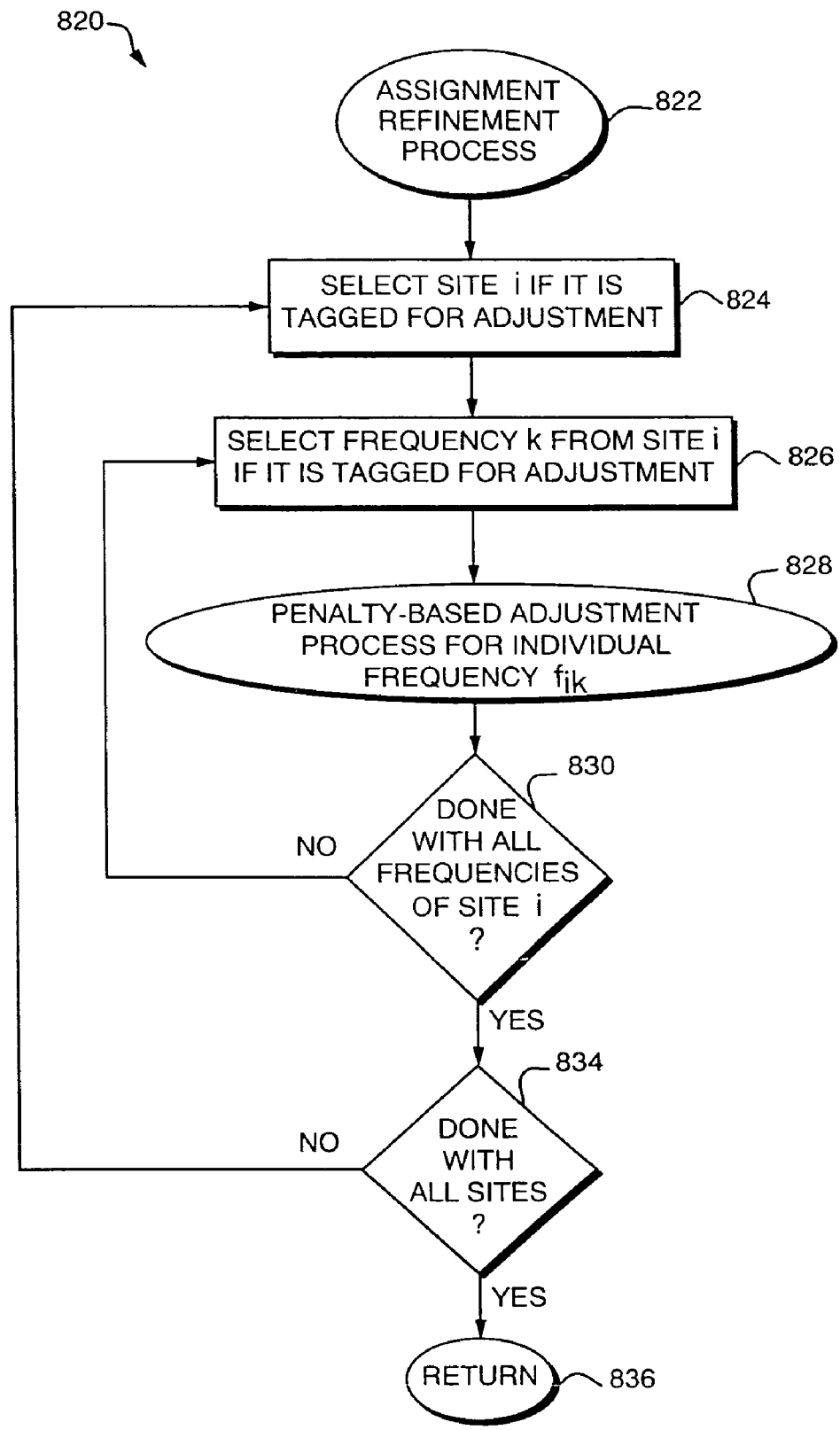
FIG. 26 is a flowchart of an example of an embodiment of a method for the assignment refinement process step.

Referring now to FIG. 26, shown is a flowchart of an example of an embodiment of the assignment refinement process 820. Generally, this process 820 cycles through all the sectors and frequencies making adjustments to each frequency. At step 824, a site or sector is selected if it is determined as being one of the sectors for readjustment. In other words, a sector is one that may be readjusted if it is not subject to pre-existing or fixed constraints, such as a neighboring network may require a sector and its assignments to remain "fixed" and not a candidate for readjustment.

Control proceeds to step 826 where s frequency k is selected from sector i's channel assignment list. It should be noted that the frequency k selected is one that is tagged for adjustment.

Now that a frequency has been identified, control proceeds to step 828 where it is determined how to modify this channel assignment so that it minimizes the penalty function. This will be described in more detail in paragraphs that follow.

At step 830, a determination is made as to whether all frequencies of sector i have been processed. If so, control proceeds to step 834. Otherwise, control proceeds to step 826 where another frequency of sector i is processed.

At step 834, a determination is made as to whether all sectors have been processed. If so, the method stops at step 836. Otherwise, control proceeds to step 824 to select another sector for processing.

It should be noted that the foregoing method applies adjustments for each frequency in accordance with the penalty method. The foregoing method may be used in embodiments in which all frequency assignments may want to be improved, as well as those embodiments in which a first portion of the frequency assignments may be tagged for adjustment, and a second portion for which assignments are to remain fixed, in which instance they are not tagged and not affected by the foregoing method steps.

Figure 27:
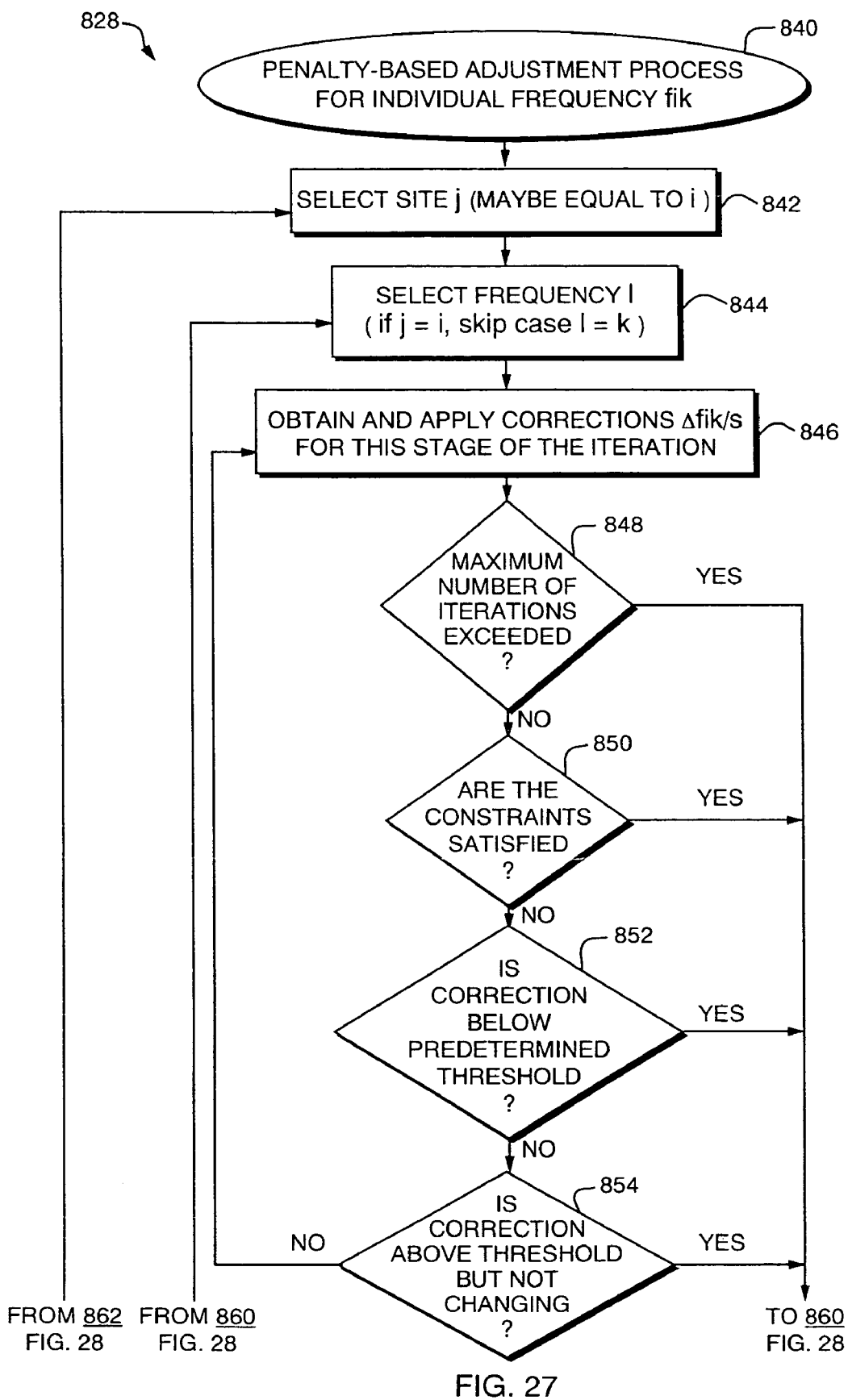
FIGS. 27-28 are a flowchart of an example of an embodiment of a method for the penalty based adjustment process.
Figure 28:
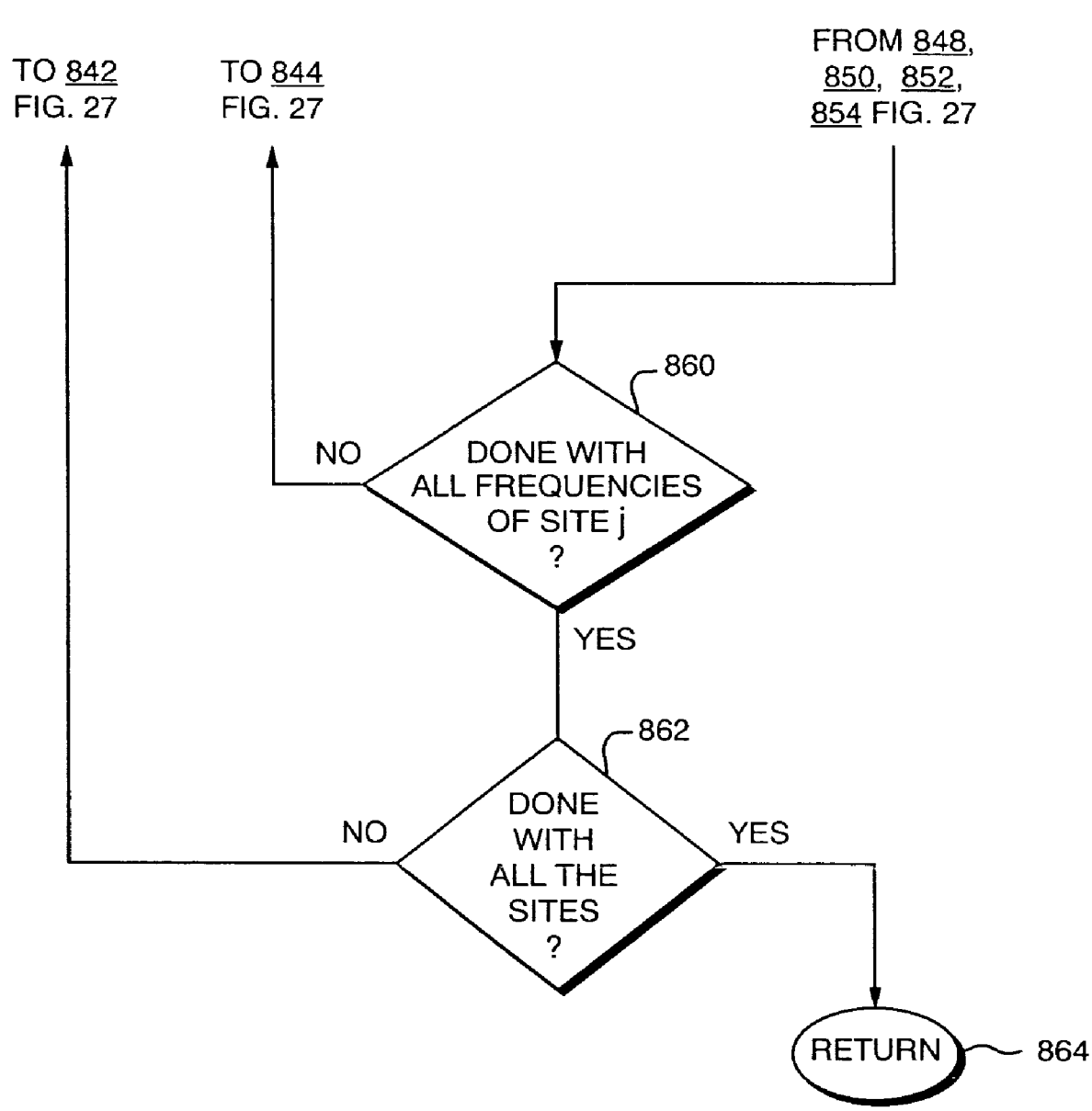

Referring now to FIGS. 27-28, shown is a flowchart of method steps in one embodiment for performing the penalty-based adjustment process for the frequencies selected. At step 842, a sector j is selected. In one embodiment, if there is a list of sectors, the first one may be selected. At step 844, a frequency l is selected from those associated with sector j. Note that if sector j=i, then the case of frequency l=k is omitted, as previously set forth in other constraints described herein.

At step 846, corrections, expressed as:

$$\Delta f_{ik \, |s}$$

for this iteration are obtained and applied. For a given frequency k of site i, a frequency "shift" is determined to reduce the value of the penalty function. This is an iterative process in this embodiment because the correction is based on a linearized version of the penalty function and it will typically take multiple iterations for convergence. The actual equations for this are described further in paragraphs that follow.

At step 848, a determination is made as to whether a predetermined maximum number of iterations is exceeded, i.e, a timeout due to performing too many loop iterations without result. If so, control proceeds to step 860. Otherwise, control proceeds to step 850 where a determination is made as to whether the constraints set forth for site i and frequency k are satisfied. These constraints are in accordance with, for example, the channel separation constraints. If the constraints are not satisfied, control proceeds to step 860. Otherwise, control proceeds to step 852 where a determination is made as to whether the correction produces a penalty value that is below a threshold value, i.e., test for convergence within a specified tolerance. If the correction is below a specified threshold, control proceeds to step 860. Otherwise, control proceeds to step 854 where a determination is further made as to whether the correction is above the predetermined threshold, but not changing. In other words at this step, the purpose is to determine if the penalty is non-zero, but does not decrease further with successive iterations. If so, then control proceeds to step 860. Otherwise, control proceeds to step 846.

Generally, the loop formed by steps 846, 848, 850, 852 and 854 continues until one of the conditions at 850, 852, or 854 causes control to proceed to step 860. At step 860, a determination is made as to whether all frequencies at sector j, as selected in step 842, have been processed. If not control proceeds to step 844 where another frequency is selected. Otherwise, if all frequencies have been processed, control proceeds to step 862 where a determination is made as to whether all sectors have been processed. If so, control returns to step 864. Otherwise, control proceeds to step 842 where another sector is selected.

From the foregoing flow charts, the calculations may be termed iterative. There is an outer iteration monitoring the overall progress and an inner iteration dealing with the linearization of the penalty function. The inner iteration is generally a consequence of the method chosen to handle the penalty function. In other words, other techniques may be included in alternate embodiments to produce equivalent corrections, and these may or may not involve gradient calculations and/or linearization.

What will now be described is one technique that may be used to calculate the correction for $f_{ik}$. Generally, the penalty function for a sector i, frequency k, relative to some other site j with frequency l may be expressed as:

$$P_{kl}^{ij} = \left(1 - \left(\frac{S_{ij}}{f_{ik} - f_{jl}}\right)^{2n}\right)^{2m}$$

where it is understood that the combination i=j and k=l is excluded. Note that the case where i=j refers to the co-sector constraints. Consider an iterative approach beginning with an estimate for the assignment and making adjustments to the k frequency to minimize the penalty function defined above. The notation as used in the flow chart of is with the label "s" as a subscript denoting the assignment at some iteration stage "s". The penalty function may be linearized with respect to frequency $f_{ik}$. The penalty function may be expanded as a Taylor series:

$$P_{kl}^{ij} = P_{kl}^{ij}|_s + \left(\frac{\partial P_{kl}^{ij}}{\partial f_{ik}}\right)\bigg|_s (f_{ik} - f_{ik}|_s) + \ldots$$

The first term in the series is the present state or value at stage s of the penalty function. The second value is the linear term and so on. This equation gives us values for the penalty function as the frequency $f_{ik}$ is changed away from its current value $f_{ik}|s$.

What will now be described is the change for the frequency that it would take to minimize this function making it zero, for example. One technique sets the left hand side of the above equation equal to zero and solves for $f_{ik}$. Prior to doing this step, an approximation may be made keeping only the linear term and ignoring the higher order terms of the series. Thus, the answer is an approximation by using this technique. However, it results in an estimate closer to the minimum in subsequent iterations. This is acceptable in that even though the minimum may not be achieved with this technique, this process may be repeated on subsequent iterations and repeated as needed. In view of the foregoing, the following relation is obtained:

$$f_{ik}|_{s+1} = f_{ik}|_s + \Delta f_{ik}|_s$$

for the next assignment given in terms of the current assignment with a correction or adjustment. This may be evaluated because the parameters are values of the current assignment. The correction may be expressed as:

$$\Delta f_{ik}|_s = \frac{1}{4mn}\left(1 - \left(\frac{S_{ij}}{f_{ik}|_s - f_{jl}}\right)^{2n}\right)(f_{ik}|_s - f_{jl})$$

where every quantity is evaluated using parameters from the s-th iteration. This may also be expressed as:

$$\Delta f_{ik}|_s = \frac{P_{kl}^{ij}|_s}{(\partial P_{kl}^{ij}/\partial f_{ik})|_s}$$

The above correction needs to be applied to $f_{ik}$ for each $f_{jl}$, in that this process needs to be repeated for all possible $f_{ik}$, $f_{jl}$ where indices i and k are fixed, and j and l are allowed to vary.

The above correction is given as a floating point number, which in general, may include a fractional part. Since we are dealing with discrete channels and cannot shift an assignment by a fraction of a channel, this is converted to an integer quantity. In one embodiment, this integer conversion may be accomplished by adding 0.5 to the correction and then converting it ti the largest integer not greater than the correction. This conversion, otherwise referred to as the floor function, works for both positive and negative corrections. Other techniques, such as the ceiling function, may also be used as known to those skilled in the art.

It should be noted that the foregoing description of the penalty function includes descriptions using the penalty function in evaluating channel assignments. There are variations of the foregoing penalty function that may be included in an embodiment. Each of these variations may be used as a measure of how well the constraints are satisfied from different viewpoints. For example, there is the channel to channel penalty denoted $$P^{ij}_{kl}$$

as in formula 634 from the Figures; and the sector to sector penalty denoted $$V_{ij}$$

in formula 670; and the overall penalty in formula 672. Other variations of the penalty function described herein may also be used as a measurement.

What will now be described is a technique that may be used in generating color code assignments, such as DCCs or SATs, using channel assignment techniques. Color codes as previously described may be used in determining which sector is responsible for a signal received at a mobile unit. Generally, a channel assignment may be reused, for example, such that two or more sectors operate at the same channel or frequency. Use of a color code in combination with a channel frequency is one technique that may be used to distinguish between signals generated by these two or more sectors. A color code may be chosen for each frequency that is reused. Thus, a color code may be selected for a sector associated with a channel since the channel is used multiple times.

Assigning color codes may be done with a variation of the previously described channel assignment techniques. In the previously described channel assignment techniques, constraints may be input to the configurator 12. For a color code assignment, there is a modification to these inputs previously described.

A modification that may be included involves the channel separation matrix. In this embodiment, the channel separation matrix represents a color code separation matrix. In this use, the channel separation matrix is tightened. In particular, for each entry in the matrix which represents a common neighbor having a zero in the matrix entry, it is replaced with a 1. Recall that a zero indicates that two sectors could be assigned or use the same frequency. Replacing the zero with a 1 indicates that the same color code cannot be used for sectors associated with the matrix entry. Generally, common neighbor refers to the sector B that is a common neighbor to both sectors A and C. In other words, sector B may be handed off a signal from both sector A and sector C. A portion of the constraint or channel separation matrix may be used as will also be described in more detail in paragraphs that follow.

Figure 29:
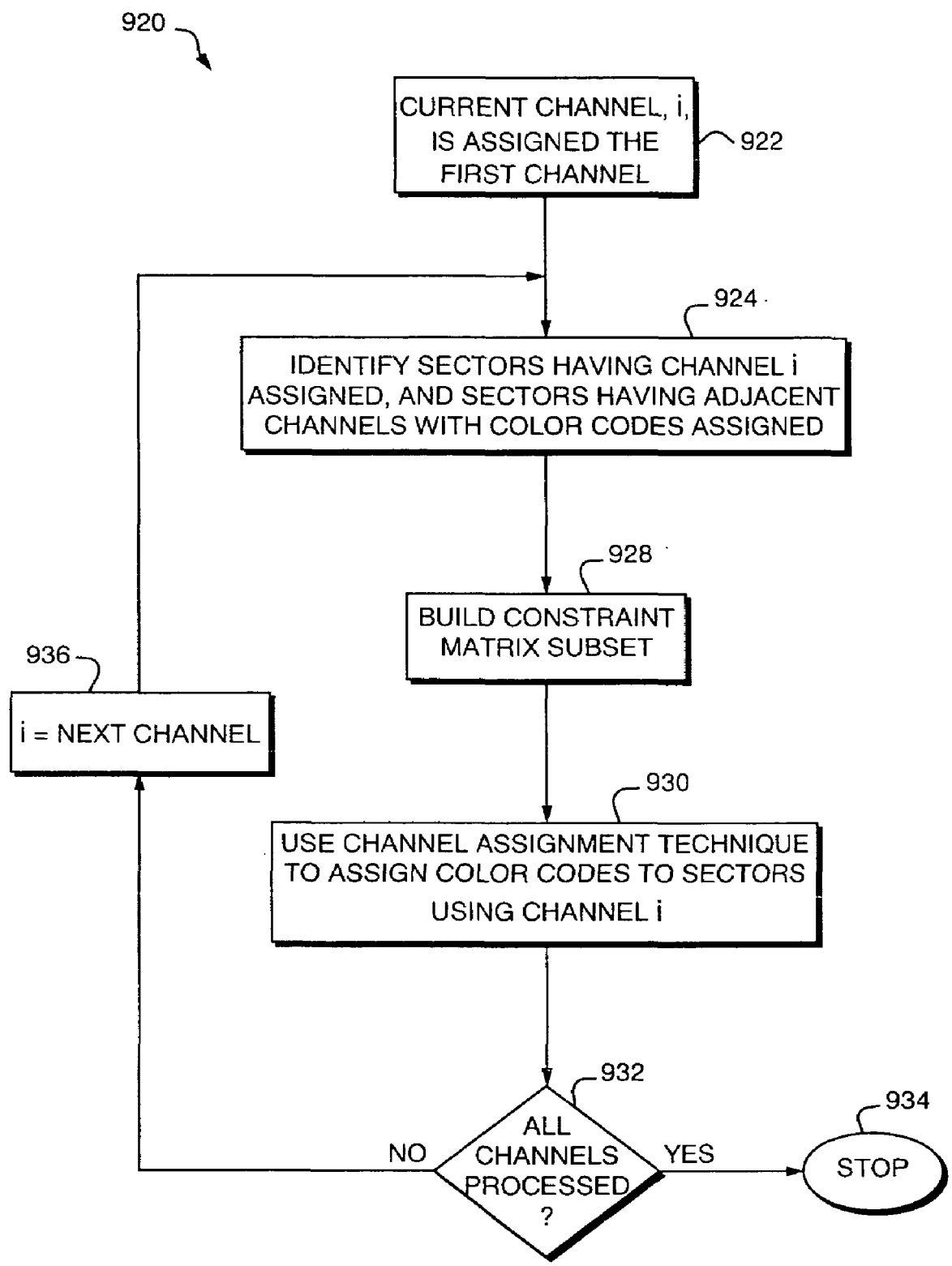
FIG. 29 is a flowchart of an example of an embodiment of a method of performing color code assignments.

Referring now to FIG. 29, shown is a flowchart of an example of a method for performing color code assignments. In the following description, the modified constraint matrix is referred to and related to steps of the color code assignment technique.

At step 922, a current channel variable "i" is assigned the first channel requiring color code assignments. Control proceeds to step 924 where sectors having channel i assigned to it and channels currently having color codes are assigned are identified. As a result of step 924, two subsets of sectors are identified. A first subset of sectors are those sectors associated with channel i requiring a color code assignment on this loop iteration. A second subset of sectors are those sectors associated with an adjacent channel to channel i, (e.g., channel i−1 and i+1) and pre-existing assignments, in which the sector already has a color code associated with the sector.

At step 928, a subset constraint or channel separation matrix is formed. This constraint matrix is also a subset of the previously described channel separation matrix. This subset channel separation matrix produced as a result of step 928 may include the more stringent channel separations for those sectors identified in step 924. Alternatively, the subset channel separation matrix may include a subset of the original channel separation matrix without being modified to include more stringent channel separations. It should be noted that this subset matrix may be used in step 930 in determining color code assignment. This subset is formed with respect to the channel separation matrix and includes rows and columns having subscripts corresponding to those identified in accordance with step 924.

Control proceeds to step 930 where a channel assignment technique is used to assign color codes to sectors. In a channel assignment technique, frequencies or channels, and sectors are the two sets of items being associated. Alternatively, in this instance for color code assignments, there is a set of color codes to be assigned, and a set of sectors to which these may be assigned. The set of color codes is the set of all possible color codes available. The set of sectors are those sectors produced as a result of step 924, the first subset of sectors which are associated with channel i and require a color code assignment on this iteration using the channel assignment technique at step 930.

At step 932, a determination is made as to whether all channels or frequencies have been processed. If so, control proceeds to step 934 where the method 920 stops. Otherwise, control proceeds to step 936 where "i" is assigned the next channel for which color codes are assigned.

It should be noted that the foregoing suggests modifications to the channel assignment technique to assign or associate color codes with sectors. The following summarized some of the analogous items and steps previously described as used in channel assignment and the color code assignment elements.

| Channel assignment | Color code assignment |
|---|---|
| A. associates a sector with a channel | A. associates a color code with a sector |
| B. a sector is chosen from a set of sectors requiring channel assignment | B. a sector is chosen from a set of sectors requiring a color code assignment for the channel currently being examined |
| C. a channel is chosen from a set of system channels | C. a color code is chosen from a set of system color codes |
| D. channel separation matrix | D. subset of channel separation matrix (note may include modified separation values) |

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method executed by a processor, comprising:
calculating a penalty value representing a quantification of cost associated with a channel assignment if said channel assignment does not satisfy predetermined constraints, wherein the channel assignment associates one or more channels with each sector of a wireless communications network and wherein said predetermined constraints include channel separation information indicating a minimum channel separation requirement between pairs of sectors;
modifying said channel assignment in accordance with a penalty function if said channel assignment does not satisfy predetermined constraints; and
modifying said channel separation information in accordance with additional predetermined constraints including carrier to interference values representing strength of a signal transmitted at a frequency if first and second sectors included in the wireless communication network are both assigned the same frequency, said carrier to interference values considering the strength of the signal from the first sector operating at a first channel in conjunction with interference generated by the second sector also operating at the first channel.

2. The method of claim 1, further comprising:
determining if a maximum number of predetermined iterations is exceeded;
iteratively performing the calculating and the modifying while the maximum number of predetermined iterations is not exceeded and the channel assignment does not satisfy predetermined constraints.

3. The method of claim 2, further comprising:
determining if said channel assignment satisfies predetermined constraints; and
accepting said channel assignment as a final channel assignment if said predetermined constraints are satisfied.

4. The method of claim 3, wherein said predetermined constraints include channel separation information indicating a minimum channel separation requirement between pairs of sectors.

5. The method of claim 1, wherein modifying said channel assignment includes:
performing penalty-based adjustment for each frequency associated with each sector in said channel assignment tagged for readjustment.

6. The method of claim 5, further including making one or more iterative adjustment to each frequency in accordance with penalty costs.

7. A memory medium readable by the processor and storing instructions executable by the processor configured to perform the method of claim 1 when executed by the processor.

8. A method executed by a processor, comprising:
receiving a channel assignment, said channel assignment associating one or more channels with each sector included in a wireless communications network;
calculating a penalty value representing a quantification of cost associated with said channel assignment if said channel assignment does not satisfy predetermined constraints, wherein said predetermined constraints include channel separation information indicating a minimum channel separation requirement between pairs of sectors; and
modifying said channel separation information in accordance with additional predetermined constraints including carrier to interference values representing strength of a signal transmitted at a frequency if first and second sectors included in the wireless communication network are both assigned the same frequency.

9. The method of claim 8, further comprising:
determining if said channel assignment satisfies predetermined constraints; and
accepting said channel assignment as a final channel assignment if said predetermined constraints are satisfied.

10. A memory medium readable by the processor and storing instructions executable by the processor configured to perform the method of claim 8 when executed by the processor.

11. A system, comprising:
a propagation module configured to determine signal strength information for locations within sectors in a wireless communications network;
a best server module coupled to the propagation module to receive the signal strength information, and configured to determine best sector information representing best sectors for handling communications from locations within the wireless communication network using the signal strength information;
a pairwise carrier/interference module coupled to the propagation module to receive the signal strength information and coupled to the best server module to receive the best sector information, and configured to determine an interference estimation related to particular frequency assignments to sectors based on the signal strength information and the best server information;
a probable neighbors module coupled to the best server module to receive the best server information and configured to determine probable neighbor data indicating probable neighboring sectors in the wireless communications network;
a channel separation matrix module coupled to the probable neighbors module to receive the probable neighbors data and coupled to the pairwise carrier/interference module to receive the interference estimation, and configured to produce a channel separation matrix that includes information indicating the minimum separation of channels between sectors based on the probable neighbors data and the interference estimation; and
a frequency assignment module coupled to the channel separation matrix module to receive the channel separation matrix, and configured to produce traffic channel configuration information that associates each sector of the wireless communications network with one or more frequency channels based on the channel separation matrix, including calculating a penalty value representing a quantification of cost associated with a proposed channel assignment if said proposed channel assignment does not satisfy the channel separation matrix, modifying said proposed channel assignment in accordance with a penalty function if said proposed channel assignment does not satisfy the channel separation matrix, and setting the proposed channel assignment as the traffic channel configuration information when the proposed channel assignment satisfies the channel separation matrix.

* * * * *